United States Patent
Brammall et al.

(10) Patent No.: US 11,490,626 B1
(45) Date of Patent: Nov. 8, 2022

(54) LOW PROFILE WATER BATH CO-EXTRUSION PROCESS FOR SAUSAGE MANUFACTURING, AND MACHINES FOR USE THEREWITH

(71) Applicant: J & B SAUSAGE COMPANY, INC., Waelder, TX (US)

(72) Inventors: Shawn Brammall, Waelder, TX (US); Danny Janecka, Waelder, TX (US)

( * ) Notice: Subject to any disclaimer, the term of this patent is extended or adjusted under 35 U.S.C. 154(b) by 377 days.

(21) Appl. No.: 16/856,828

(22) Filed: Apr. 23, 2020

Related U.S. Application Data

(62) Division of application No. 14/563,517, filed on Dec. 8, 2014, now Pat. No. 10,645,939.

(60) Provisional application No. 61/912,871, filed on Dec. 6, 2013, provisional application No. 61/969,487, filed on Mar. 24, 2014.

(51) Int. Cl.
   *A22C 13/00* (2006.01)
   *B65G 17/24* (2006.01)
   *A23B 4/03* (2006.01)
   *A22C 11/02* (2006.01)
   *A22C 11/00* (2006.01)

(52) U.S. Cl.
   CPC ........ *A22C 13/0016* (2013.01); *A22C 11/008* (2013.01); *A22C 11/02* (2013.01); *A23B 4/031* (2013.01); *B65G 17/24* (2013.01); *A22C 2013/0023* (2013.01); *A23V 2002/00* (2013.01)

(58) Field of Classification Search
   CPC ... A22C 13/0016; A22C 11/008; A22C 11/02; A23B 4/031; B65G 17/24
   USPC .................................................... 452/30–32
   See application file for complete search history.

(56) References Cited

U.S. PATENT DOCUMENTS

| | | | | |
|---|---|---|---|---|
| 5,795,605 A | * | 8/1998 | Morgan | A22C 13/0016 426/516 |
| 5,843,504 A | * | 12/1998 | Kobussen | A22C 11/001 426/241 |
| 5,938,520 A | * | 8/1999 | Scherch | A22C 11/008 426/277 |
| 6,024,637 A | * | 2/2000 | Scherch | A22C 11/001 198/853 |
| 6,245,369 B1 | * | 6/2001 | Kobussen | A23P 30/25 426/231 |

(Continued)

*Primary Examiner* — Richard T Price, Jr.
(74) *Attorney, Agent, or Firm* — Jackson Walker LLP

(57) ABSTRACT

A low profile water bath co-extrusion process for sausage manufacturing is disclosed, along with machines for accomplishing this process. The process is an automated assembly line which begins with co-extruded food product, such as a sausage emulsion coated with collagen and finishes with cooked, boxed, packaged link sausage. The process includes the steps of co-extrusion, linking and cutting the co-extruded food product to individual links. Following these steps and prior to a liquid smoking step, the casing is prepared by steps which includes chemical treatment of the individual links in a water bath, while dehydrating the product in a salt solution, the water bath being a two-part process and following the water bath using a forced hot air drying step. Machines disclosed include a modification of prior art screw driven water bath and a novel roller/conveyor forced hot air drying assembly that subjects individual links of a co-extruded food product to a rolling motion while simultaneously being transported horizontally and being subject to forced hot air drying.

22 Claims, 16 Drawing Sheets

(56) References Cited

U.S. PATENT DOCUMENTS 6,988,943 B2 * 1/2006 Reutter .............. A22C 13/0003
  452/40
2014/0170945 A1 * 6/2014 Bachtle ................. A22C 11/02
  452/32

* cited by examiner

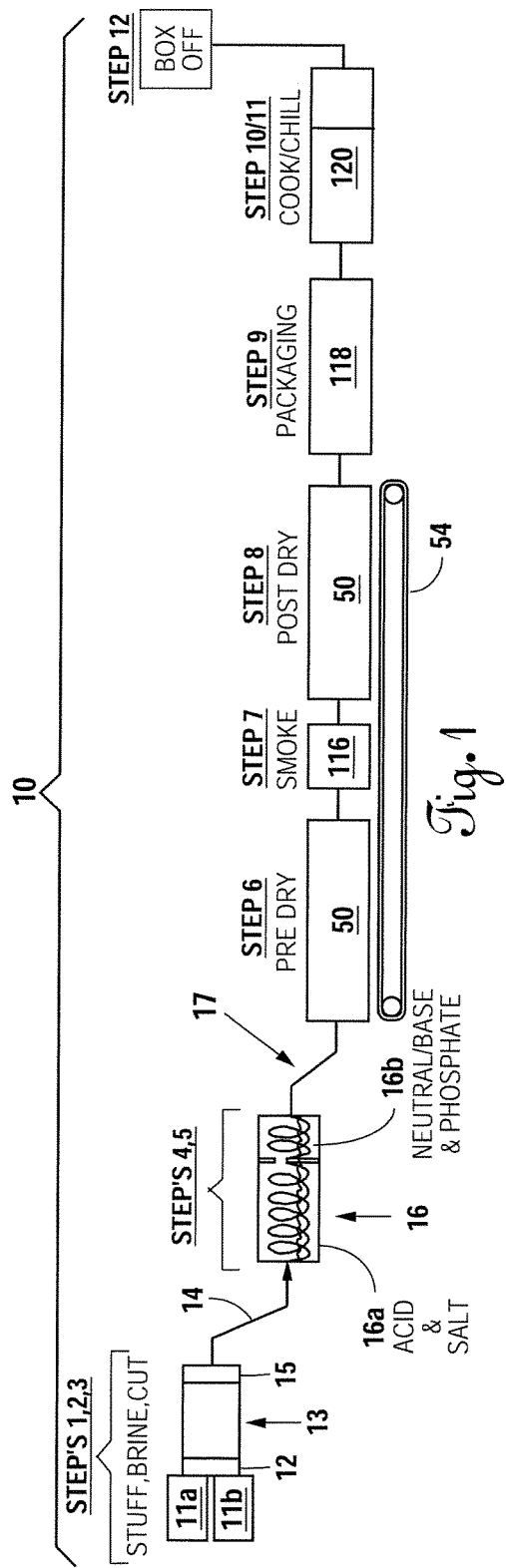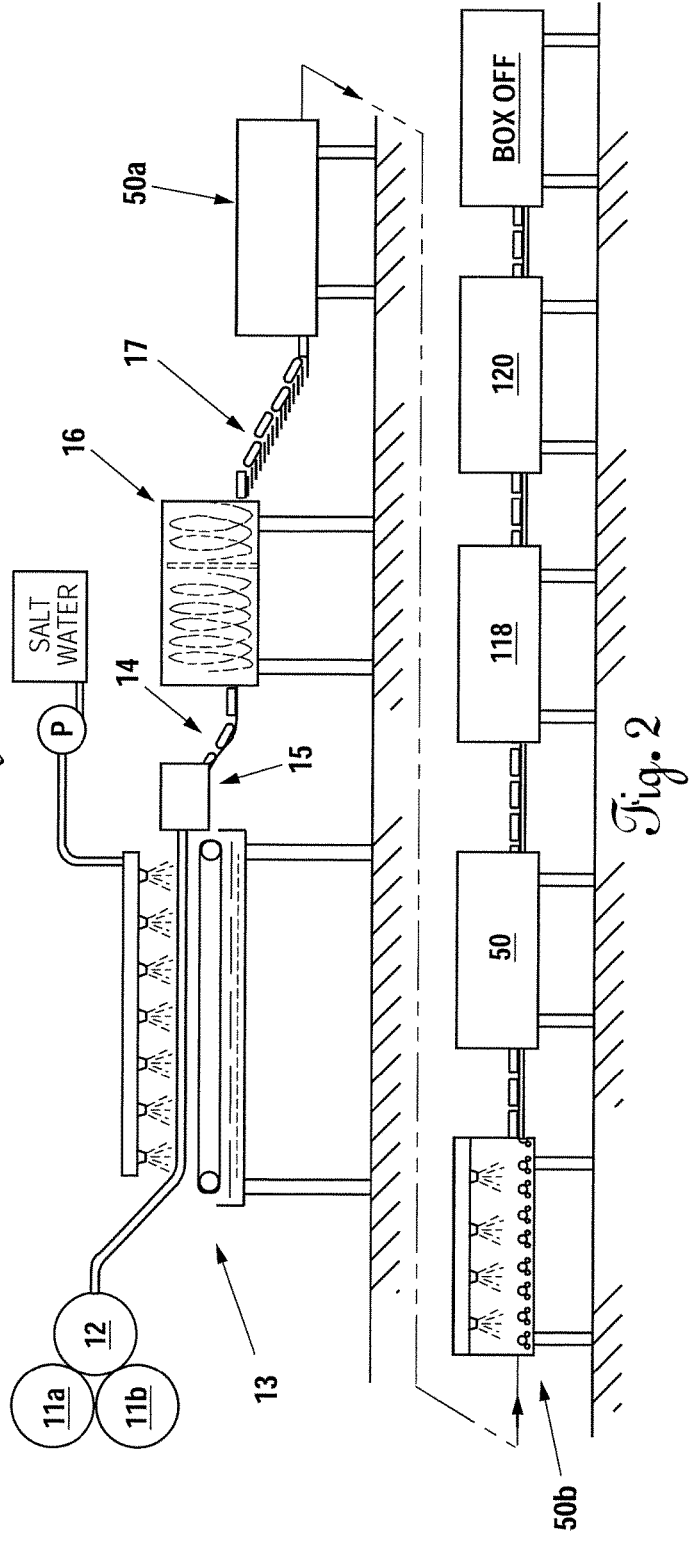

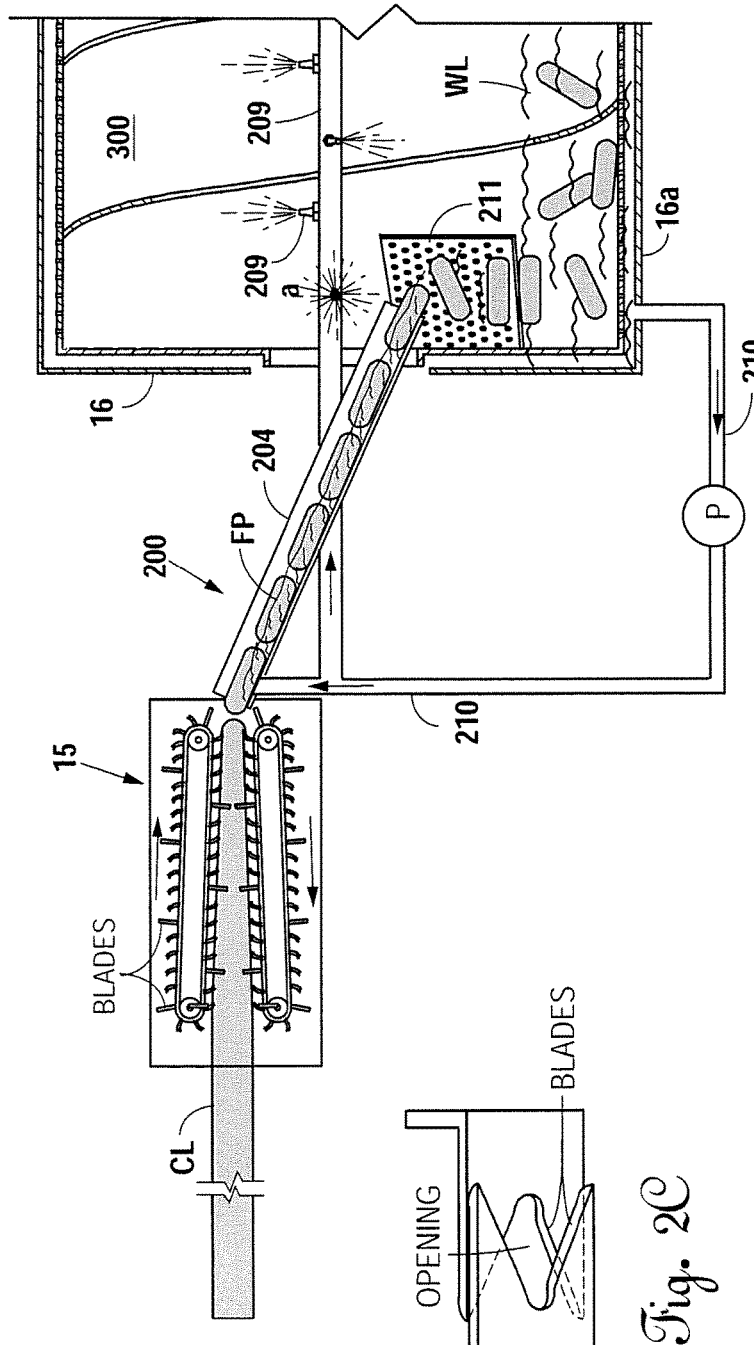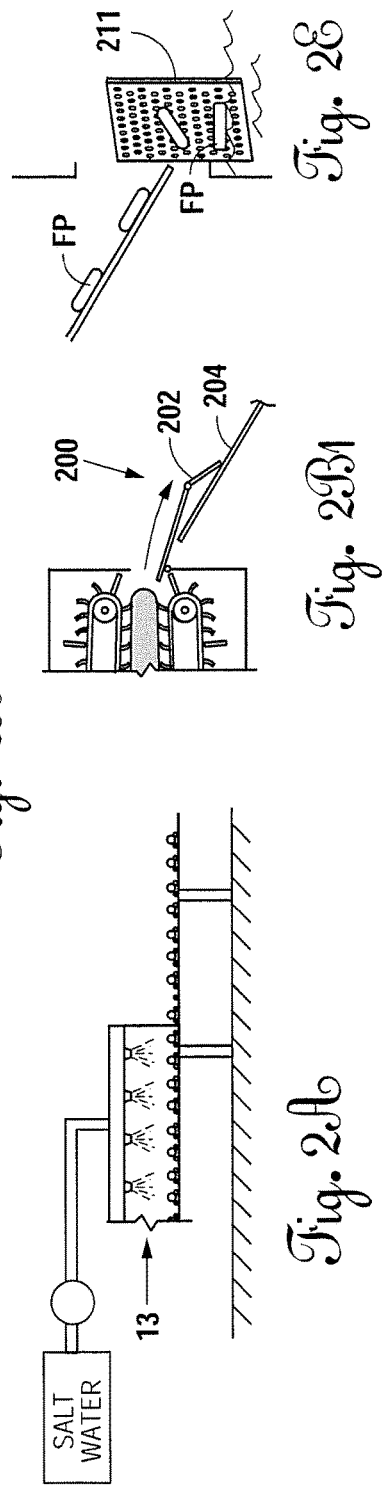

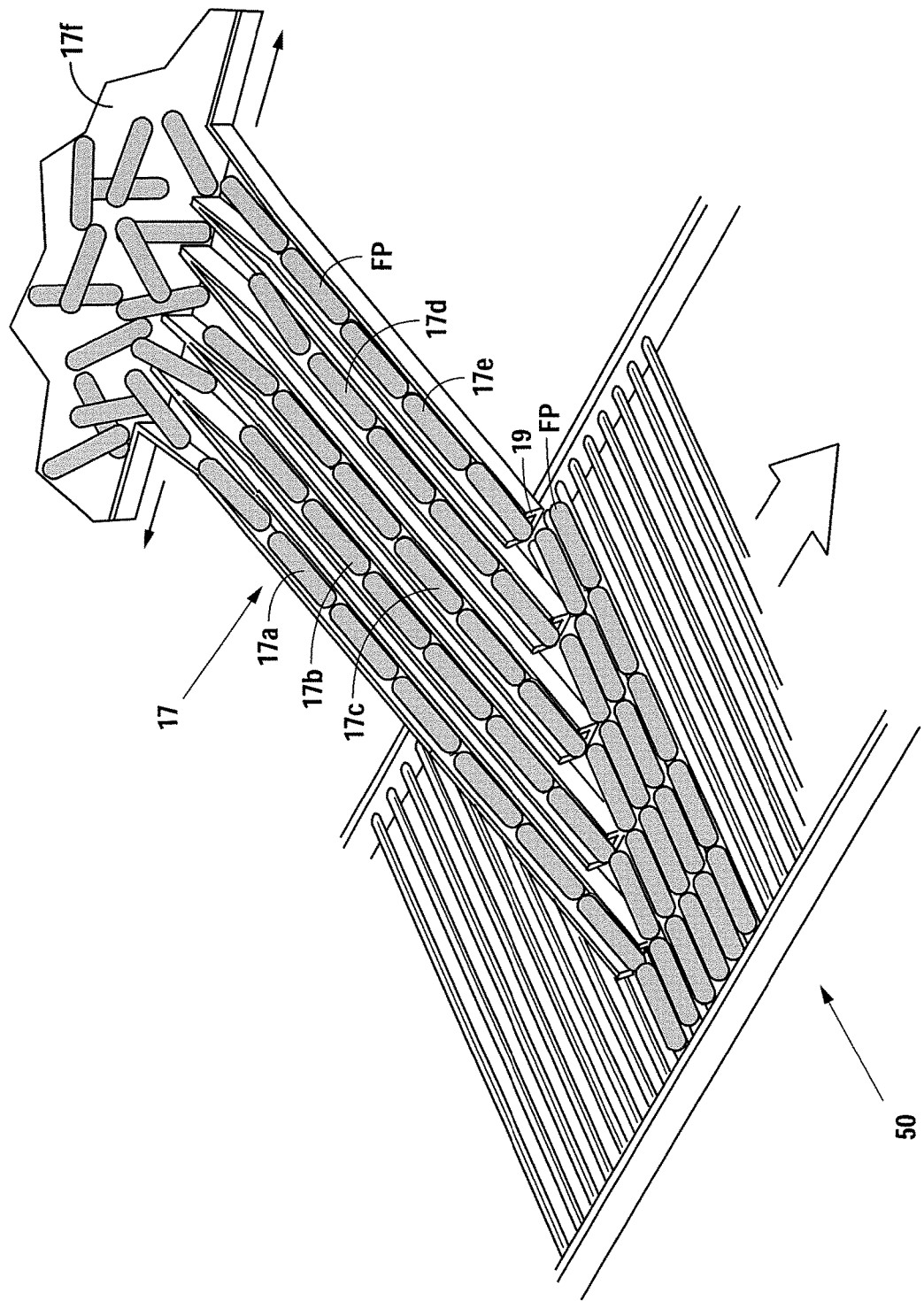

LOW PROFILE WATER BATH CO-EXTRUSION PROCESS FOR SAUSAGE MANUFACTURING, AND MACHINES FOR USE THEREWITH

RELATED APPLICATIONS

This is a divisional patent application of U.S. patent application Ser. No. 14/563,517, filed Dec. 8, 2014, which claims priority to U.S. Patent Application No. 61/912,871, filed Dec. 6, 2013, and U.S. Patent Application No. 61/969,487, filed Mar. 24, 2014. Each of these prior applications are incorporated herein by reference in their entirety.

FIELD OF THE INVENTION

Sausage manufacturing, more specifically, the process of using multiple water baths, as well as pre-smoking and post-smoking drying steps, in the process of manufacturing of sausages.

BACKGROUND OF THE INVENTION

Sausage making may include (1) ground, fresh sausage products, (2) emulsion-type sausages, such as frankfurters, wieners, bologna, liver sausage, (3) fermented sausage products. The production of sausage dates back centuries. Traditionally, in one embodiment, meat in an emulsion in a semi-solid form is stuffed into a natural or artificial casing, such as a collagen casing comprising animal protein. Collagen casings are made from a naturally occurring protein, typically bovine collagen from the animal hide is used, and may be edible.

Casings for sausage and other meat products may be natural or artificial. Natural casings are sometimes eaten and sometimes peeled off before being eaten and comprise intestines of animals. Artificial or sometimes called manufactured casings fall into two categories. They may be made from natural materials, such as cellulose collagen, artificial (synthetic) materials, such as thermoplastics or polymers. Manufactured casings from artificial materials include those casings made from cellulose from plants or alginate from seaweed or those casings made from collagen found on the underside of the hide of some animals. Typically, structural and functional elements of a system for making sausage or other coated and extruded meat product depend on the type of casing used and often machinery used where one type of casing is not suitable for another type of casing. One type of casing is made from collagen, which is obtained from the corium layer of selected split cattle hides. Collagen casings are substantially permeable for smoke and water vapor.

There are a number of problems associated with the system of sausage making using collagen as set forth hereinabove. One problem is the physical size of the machinery required and a second problem is the cost and maintenance of the machine. As regards to the size, the prior art, especially the pre-dry (pre-dry meaning before the smoking step) described above, requires a machine that is huge, both in the longitudinal and vertical dimensions, but especially in the vertical dimension. Prior art pre-dry (before smoking) typically uses a serpentine system of baskets, which has multiple chains and gears, typically thousands of gears and a hundred or more baskets. The maintenance alone on such systems may be hundreds of thousands of dollars a year. What the prior art lacks is a mechanical system that has a limited vertical profile, which also lacks gears and baskets.

The time that the standard sausage making processes take is long and the machines used are large and complex, covering a large area. In an effort to reduce time and complexity, Applicant provides a new process indicated at FIG. 1.

Emulsion-type sausage making may be done by a process to co-extrude a strand of sausage material, which has an inner core of meat emulsion and an outer surface material that can be coagulated to provide an encasement for the strand. The outer surface material may consist of a gel comprising collagen protein. Coagulation of the collagen normally includes subjecting the extruded strand to a brine (salt) solution. Coagulation as used herein means the step or steps of firming up or hardening and stabilization of the casing. This is primarily done in two ways. First, by removal of water from the collagen gel and, second, by cross-linking the collagen fibers.

Collagen can be set by known methods in the preparation of artificial sausage casing. Co-extrusion takes place into a brine setting bath. Under the influence of the setting bath or solution, the collagen is at least partly coagulated or set in contact with the extruded food stuff and the formed coated food stuff then emerges from the bath to undergo further process steps. Stabilization may, however, be by other means, for example, air drying.

Drying of collagen seems to stabilize the food products. Fibrous materials, such as collagen casing, may be convection dried as in the prior art, which is slow and expensive. The convection drying apparatus of the prior art uses many baskets and convective hot air. During convective drying, the water filled pores of the collagen structure collapse because of capillary forces. The collagen chains begin to stick together.

Collagen is naturally cross-linked. Collagen may be further cross-linked by chemical cross-linkers (such as those found in liquid smoke), enzymes, metallic ions or other mechanisms. Cross-linking may also be achieved by physical methods, such as UV, temperature treatment, and dry state, radiation, and electron beam. Cross-linking decreases solubility and susceptibility to enzymes and microbial attack.

The process for producing co-extruded collagen encased food product, such as meat products and sausage, typically includes the extrusion of a meat emulsion with an amount of collagen gel. In a current process for making co-extruded sausage and links, coarse ground emulsion is stuffed through a stuffing horn in a co-extrusion head. The emulsion is co-extruded with vacuumed collagen gel, which is typically about 4 to 5% collagen at 4% solids.

One current step in the manufacturing of sausage by co-extrusion occurs when the meat product (typically in the form of a semi-solid emulsion) is coated with a collagen gel to produce a meat product. The meat product is then subject to a solution, for example, a brine salt that begins dehydration, which starts coagulation or setting of the collagen gel. The brine usually provides sufficient set or firmness for the subsequent linking and cutting steps to cut the product into links. The partial dehydration helps collapse the collagen onto the emulsion. Yet the casing continues to be rehydrated during this step due, in part, to rehydration of the collagen from the inside—that is, from moisture in the meat emulsion.

The brine solution of this step may be about 22 to 26% salt dissolved in tap water. This resident time for the product may be about 18 to 24 seconds to bring about sufficient dehydration for cutting and linking. The brine may be at ambient temperature. Following the brine step, the linear (coaxial) meat product is conveyed through a crimper wheel or other suitable device to link and cut the sausage to lengths and then the product is conveyed to a pre-dry (measuring before the smoking step), rocker basket serpentine system.

The sausage is pre-dried in a rocking basket system at about 150° F. to about 170° F., with low humidity (typically about 5 to 20%), to evenly dry the product and keep the product round. The pre-dry time is typically about 20 to 30 minutes. This is typically done in a huge machine, due to the slow hot air heating required to sufficiently dry the food product. It has rocking baskets to heat evenly the individual product items and keep them round.

Typically, following pre-drying (meaning before smoking), the smoke and cross-link step occurs. The sausage links are transferred from the pre-dry baskets to the smoking baskets and run through a liquid smoke, dying and cross-linking solution. The time in the partial submersion and/or deluge bath is typically about 10 to 15 seconds. The liquid smoke solution is at about 110° F. to 120° F.

Following the smoke and cross-link, the post-drying (meaning after smoking) step is carried out. The sausage links are post-dried on a conveyor belt at about 150° F. to 170° F. with low humidity. This will help cross-link the collagen and develop or set the color. Post-drying typically runs about 8 to 12 minutes, with the links at about 120° F. to 130° F. (oven convective air temperature) before going to the vacuum packaging machine.

SUMMARY OF THE INVENTION

The process for producing co-extruded collagen encased food product, such as meat products and sausage, typically includes the extrusion of a meat emulsion with an amount of collagen gel (which may include a cross-linking agent) coating the exterior of the meat emulsion.

In one embodiment, Applicant discloses a process for producing a collagen encased food product comprising one or more of the following steps. Co-extruding of food emulsion and coating the food emulsion exterior with a gel comprising collagen and possibly a cross-linking agent or agents and possibly a coloring agent, followed by subjecting the continuously co-extruded product to a brine bath. Next, link cutting, separating the continuous product into discrete food product items. Next, Applicant contacts the multiple discrete collagen gel coated food product with a first aqueous solution, the first solution having a pH range of about 1.0 to 3.2, a salt content of about 12% to 22% by weight, at a temperature of about 120° F. to about 140° F. for about 4 to 12 minutes. The first heated solution is gently agitated and carries the food product from a first point, where it received from the previous processing step to a longitudinally spaced apart second point, where it is ready for transfer to a subsequent aqueous processing step. The next step typically includes contacting the collagen coated food product with a second solution, the second warm, agitated, aqueous solution, being a pre-conditioning solution, to help open the fibers of the collagen. The second aqueous solution may comprise an aqueous solution of about 12 to 22% food grade phosphates, and typically has a pH of about 7.0 to about 9.0, and a temperature of about 125° F. to about 150° F. This second solution is gently agitated and carries the food products from the first point where it is received from the previous step to a longitudinally spaced apart second point, where it is ready for transfer to a subsequent step, which may be a pre-drying step. The heated aqueous solution of these two steps will replace the function of the rocking baskets of the prior art air dry units by using water pressure and agitation to maintain roundness, helps coagulate the food product, and prepare it for the subsequent steps The next step will typically include a pre-drying step before the smoking step, and a post-drying step after the smoking step. The pre-drying step typically includes transfer of the multiple discrete food items from the water bath machine through the use of a vibrating laning device for placement of the sausage links or food items on a novel roller conveyor. The conveyor may carry the food items through a pre-dry oven at a temperature of about 160° F. to about 210° F., with a humidity in the range of 5 to 15%, to evenly dry the product while maintaining the product's roundness. The pre-dry time is usually about 2 to 10 minutes. It will help remove water from the outer portion of the food product so as to allow the liquid smoke to be absorbed.

The pre-drying step has removed at least some of the water from the aqueous solution of at least some of the water left by the aqueous solution used in the steps prior to the pre-dry. The pores of the casing having been partly opened in the water bath solution and having the residual water removed therefrom in the pre-dry step, the food items are ready now for the application of the liquid smoke. The liquid smoke typically contains a cross-linking agent and a dye, and may be applied to the still warm product through a sprinkle system or complete immersion or a combination of the two. The liquid smoke is typically absorbed at least partially into and through the casing.

The post-drying step, following the smoking step, typically includes providing a roller conveyor oven (like that of the pre-drying step) with an oven set at temperature of about 160° to 210° F. to carry the product, providing an atmosphere with a humidity approximately 5 to 15%, to help further coagulate and cross-link the collagen and develop the set of any color while maintaining roundness. The post-dry time usually takes about 3 to about 10 minutes. Subsequently, the steps of packaging, completing cooking, and chilling the food product are accomplished.

BRIEF DESCRIPTION OF THE DRAWINGS

FIG. 1 is a schematic drawing of the machinery layout and steps of Applicant's process.

FIG. 2 is a more detailed view of the pre-smoking layout and steps of Applicant's method.

FIG. 2A is an elevational view of a device for use in Step 2 of the method.

FIG. 2B is an elevational view of a linker/cutter and water cascade for use with Applicant's method with the linker cutter situated, for illustration purposes only, 90 degrees to its actual position with respect to the water cascade.

FIG. 2B1 illustrates detail of Applicant's water cascade for use in transporting individual links from the linker/cutter to the first end of the hot water bath assembly, in elevation.

FIGS. 2C, 2D, 2E, and 2F illustrate additional details and embodiments of Applicant's water cascade.

FIG. 5 is an isometric view of a vibrating laning device for use with Applicant's roller conveyor.

DETAILED DESCRIPTION OF THE PREFERRED EMBODIMENT

Figure 2D:
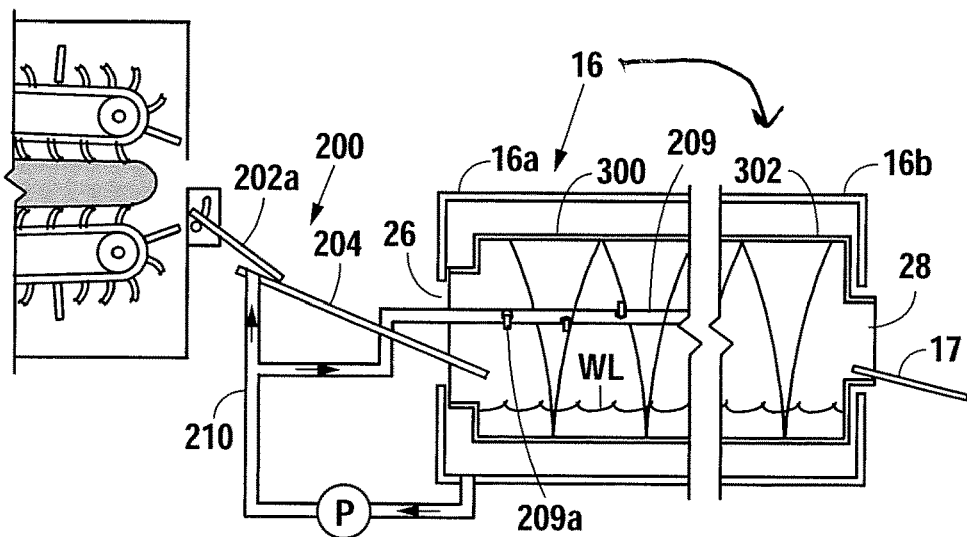
Figure 2F:
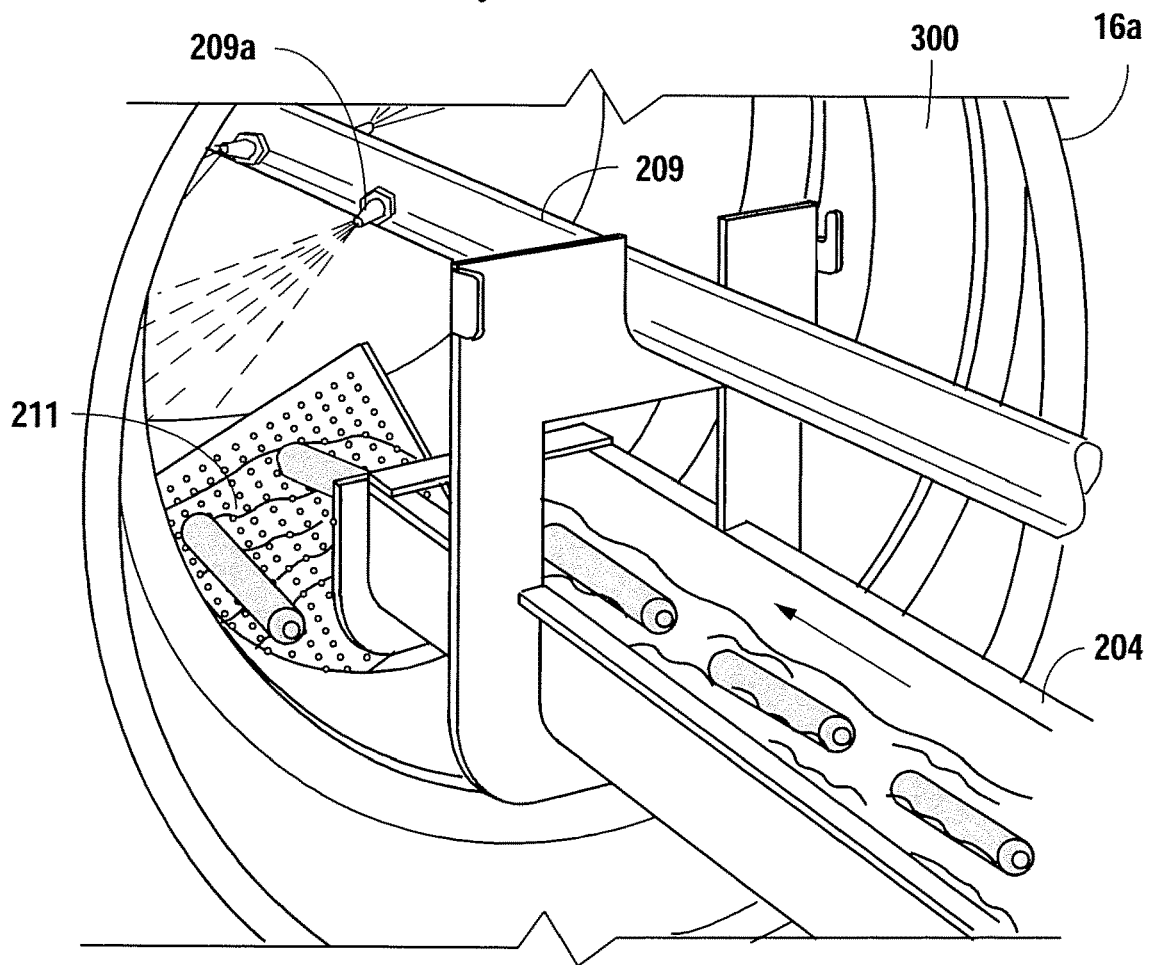

Turning to FIG. 1, an embodiment of Applicant's water bath co-extrusion sausage manufacturing process 10 with various steps and devices for manufacturing sausage or other similar food products, including collagen coated food products, is disclosed. The process begins with a semi-solid meat emulsion, for example, a mix of 0-50% beef, 0-75% pork, and/or poultry, and 0-70% other ingredients including flavoring and a cross linker (optional). The process includes pre-smoke and post-smoke steps, "wet" working and treating individual sausage links, "wet" cooking packaged links and pre and post smoking steps featuring forced hot air drying.

Extrusion, brine and cutting are Steps Nos. 1, 2, and 3. Following these three steps to set or bond the following with some of their functions described: Step No. 4 (wet)—heat and coagulate casing; Step No. 5 (wet)—rinse and open collagen fibers; Step No. 6 (dry)—pre-dry prepare links for smoke; Step No. 7—liquid smoke; Step No. 8—post-dry prepare links for packaging by drying the exterior of the product, completing the cross linking, and setting the color; Step No. 9—package; Step No. 10 (wet)—cook (to pasteurization); Step No. 11 (wet)—chill; Step No. 12—box cooked packaged links.

The first two steps are generally known in the prior art and their structural elements, function, and advantages are generally the same as those of the prior art (meat stuffers by Vemag, a brine bath by Reiser). Stuffing heads 11a and 11b are provided for stuffing meat emulsion and collagen to feed co-extrusion head 12. In one embodiment, in step 1, ground sausage and vacuum collagen (about 2.8 to 3.2% collagen to emulsion by weight at about 6% solids, or about 2 to 7% solids) are fed to co-extrusion head 12. Collagen is available from DeVro, Columbia, S.C. A Vemag 20e vacuum stuffer may be used to feed head 11b.

Step 1 which includes stuffing and co-extrusion may include the adding of a chemical cross-linker (liquid smoke, for example), such as about 0 to 4% to the collagen weight that is being stuffed, the cross linker to help coagulation. The co-extrusion head typically has two cylinders that counter rotate with respect to one another to align the collagen fibers in a tubular layer of woven collagen into which the meat emulsion is co-extruded so as to create a coaxial linear food member—emulsion inside covered with a woven collagen casing.

In step 2, a brine solution may be used to partly dehydrate collagen to make it stiff enough and prepare the linear food member for linking and cutting. In step 2, a continuous (uncut) co-extruded linear food member product is conveyed through or subject to a brine bath 13 (see FIG. 2A), as by sprinkling with a solution of about 22% to about 26% salt, such as sodium chloride or calcium chloride. The solution may be heated to a temperature of about 110° F. to 120° F. for soaking the food product about 5 to 15 seconds. The brine will begin to firm up the collagen by dehydration, which set will usually be sufficient to cut and link (see Step 3 below). The stuffed linear food member is then conveyed through brine bath 13 to a cutter/linker 15. From cutter/linker 15, it may be transferred via water cascade 200 or other suitable means to a first hot water bath assembly 16.

While the link cutting step, that is, the third step, may be performed as known in the prior art, the product in a preferred embodiment is conveyed and transported through a progressive, sequential linking/cutting machine 15 to be cut into separate links. The third step may use, in a preferred embodiment, a modified sequential cutter (see FIG. 2B). It is noted that the sequential cutter illustrated is typically not used for collagen, rather it has been known for use with alginate casing. Moreover, the use of such a cutter will, following cutting, leave a small opening at the removed ends of the link, which small opening exposes the meat emulsion. The alginate type link cutter tends to result in small openings at the end of the casing, thus exposing less meat emulsion. A modified VMag sequentially or progressively closes the ends of the sausage casing before severing the casing completely to generate links. The VMag cutting/linking machine is modified in the following manner. The blades (see FIG. 2C) sequentially squeeze the product as it moves through the cutter, with the openings getting smaller as the linear member is pulled through and breaks.

Figure 3:
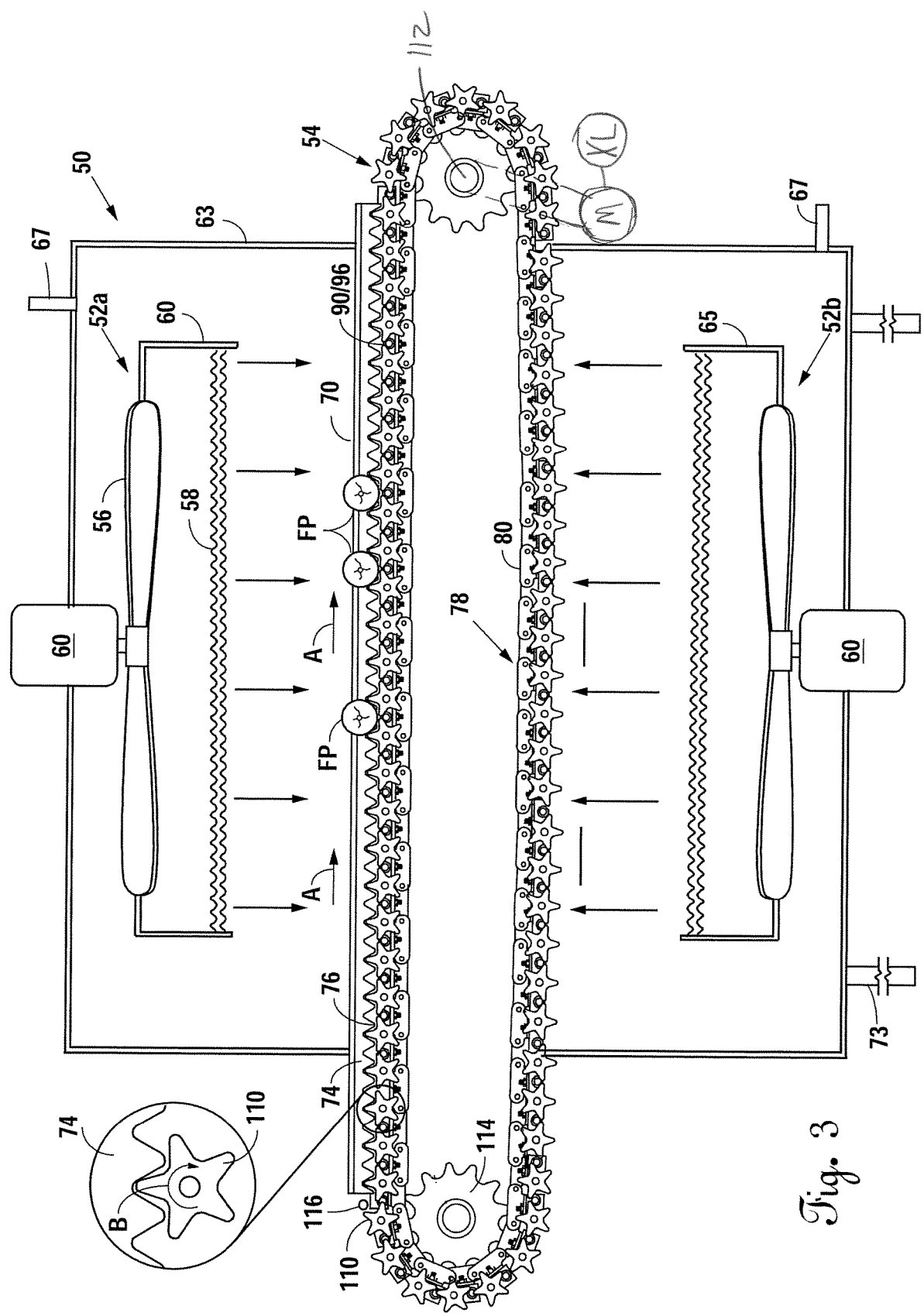
FIGS. 3-3F are various views of a novel drying and transport assembly for use with Applicant's method.

FIGS. 2B, 2B1, and 2C-2F illustrate details of water cascade transport assembly 200 designed to transport the individual links of the food product from the end of cutter/linker into a first end of the hot water bath assembly 16. Such an assembly 200 is designed to receive moving water 201 from a water source, such as section 16a, with a tube 210, at or near the removed end of the cutter 15 as seen in FIGS. 2B and 2D. An inclined chute 204 may have a hinged member 202 (FIG. 2B1) or 202a (FIG. 2D) at the upper end thereof, the hinged member to control the speed of the links as they slide down to the trough or chute 204. The speed of the water flow (see pump P, FIG. 2D and 46a of FIG. 4, which may provide solution to water cascade transport assembly 200 in a preferred embodiment) determines the speed of the links and will be matched with the speed of the links as they are carried through the water bath assembly to insure that there is no "linkjam". At the removed end of the chute is a canted, perforated, tilted plate 211 with multiple holes to receive the water and links and to direct and turn them so that they enter the water of the first section "broadside" (sideways) and so as to avoid the links striking the walls of screw 30 or basket/shell 300 (see FIGS. 2E and 2F). The broadside turn is to protect the open ends where the emulsion is exposed that will help turn the sausage sideways or at least partially sideways as seen in FIGS. 2B and 2B3. The links will typically enter an opening at the first end of the hot water bath assembly partially or fully rotated so as to protect the exposed ends of the food product.

FIGS. 2B and 2D illustrate the use of a spray bar 209 with jets 209a to direct the first aqueous solution (from first section 16a) onto the screw or other parts of assembly 16 to prevent product sticking to the walls thereof.

FIGS. 2, 2D, 2F, 4, 4A, 4B, 4C, and 4D illustrate a first combined water bath and cooking assembly 16 (sometimes referred to as a hot water bath assembly or water bath assembly) for use in Steps 4 and 5. Baskets or shells 300/302 contain screws 30/31 partially submerged in heated water W (that is, an aqueous solution) in first sections 16a/16b with air jets 36 for generating turbulence. Perforated inspection doors 301 are provided in both shells. The screws and turbulence causes the food product FP to be buoyantly and gently agitated while moving longitudinally, so they remain in their original round shape and not damage the casing or ends. Housing 18 contains rotating first and second shells 300/302 with a transfer plate 304 (see FIG. 4B) between. The function of the first water bath/heating step 4 is to bond or set (at least partly) the casing so that it is firm. The casing typically has multiple layers of collagen, and a collagen layer adjacent the emulsion. The first bath will firm up the delicate casing by helping adjacent layers bond one to the other and will help the collagen layer adjacent the emulsion stick or set to the emulsion.

FIGS. 2B, 2D, 4, and 4A-4D show hot water bath assembly 16 having a first section 16*a* and a second section 16*b* for the first and second water bath steps 4 and 5. Hot water bath assembly 16 may have an outer housing 18. Outer housing 18 typically includes a cylindrical housing portion 20 and a first end wall 22, a divider wall 29, and a second end wall 24. A hinge 25 may be provided and the outer housing 18 may be hinged to pivot, thus providing a top half portion 18*a* or cover and a bottom half (water holding) portion 18*b*. End walls 22/24 typically have end wall openings 26/28 for transfer of links into the water bath assembly 16 or out of the baskets 300/302 of the assembly. The baskets have perforations and doors (see FIG. 4C). Food product FP (also called links) is transferred from linking/cutting machine 15 to water W at a water level WL typically maintained below the top perimeter of bottom half portion 18*b*. Rotating baskets 300/302 with screws 30/31 are provided with helical blades 32 for rotating in the water W containing food product FP to help move product axially or longitudinally from opening 26 to opening 28, while the food product is being heated and treated with the chemicals contained in the water. A heater 48*a* is provided to heat the first aqueous solution, in first section 16*a*. As set forth below, the food product is subject to two separate baths, with the water in each typically both but at least the first section having separate chemical makeup and heat, water flow, pH and screw controls.

Figure 4:
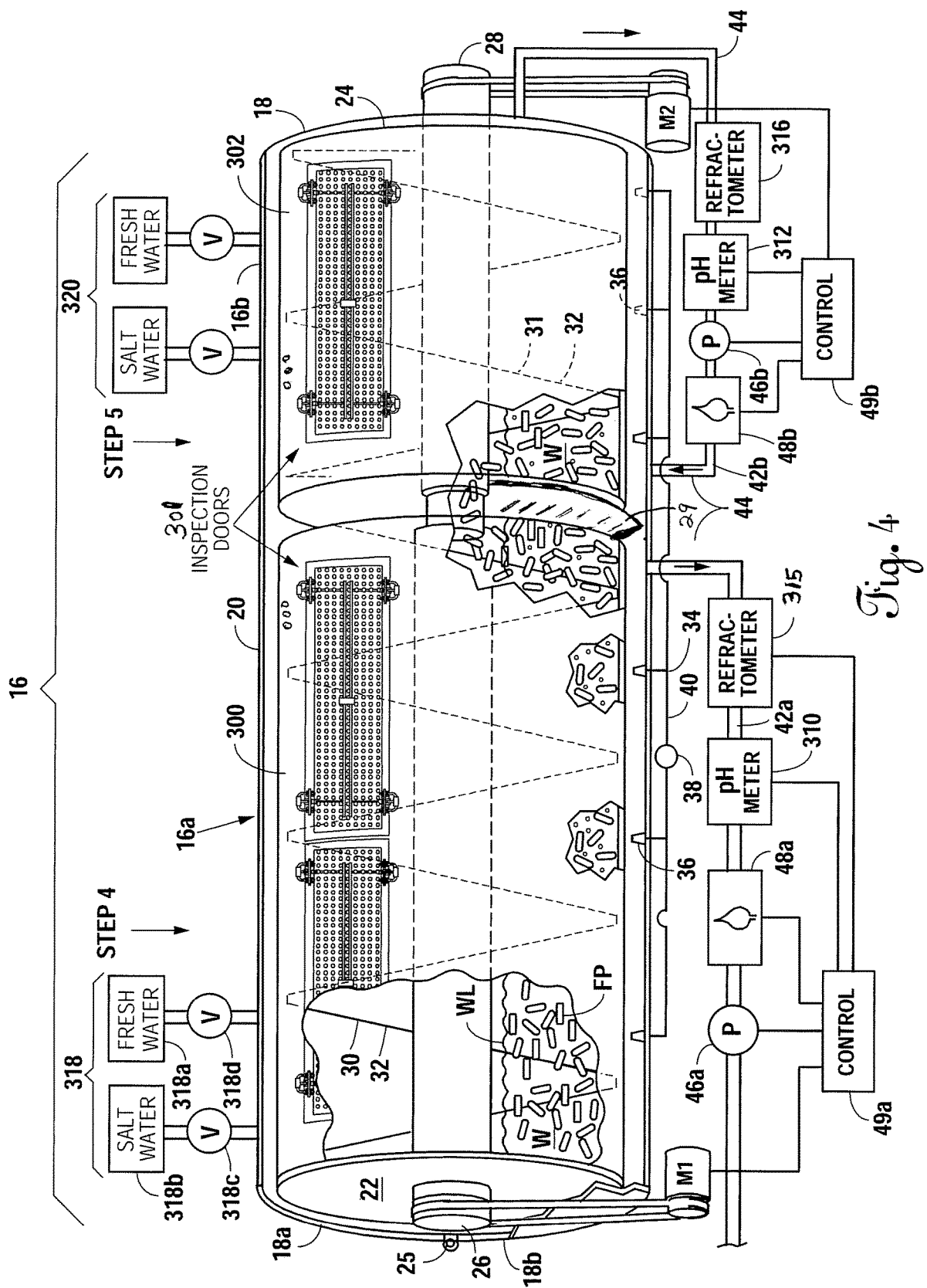
FIG. 4 is an elevational view partly cutaway and FIG. 4A schematic view of an apparatus for use with water bath steps of Applicant's method.
Figure 4B:
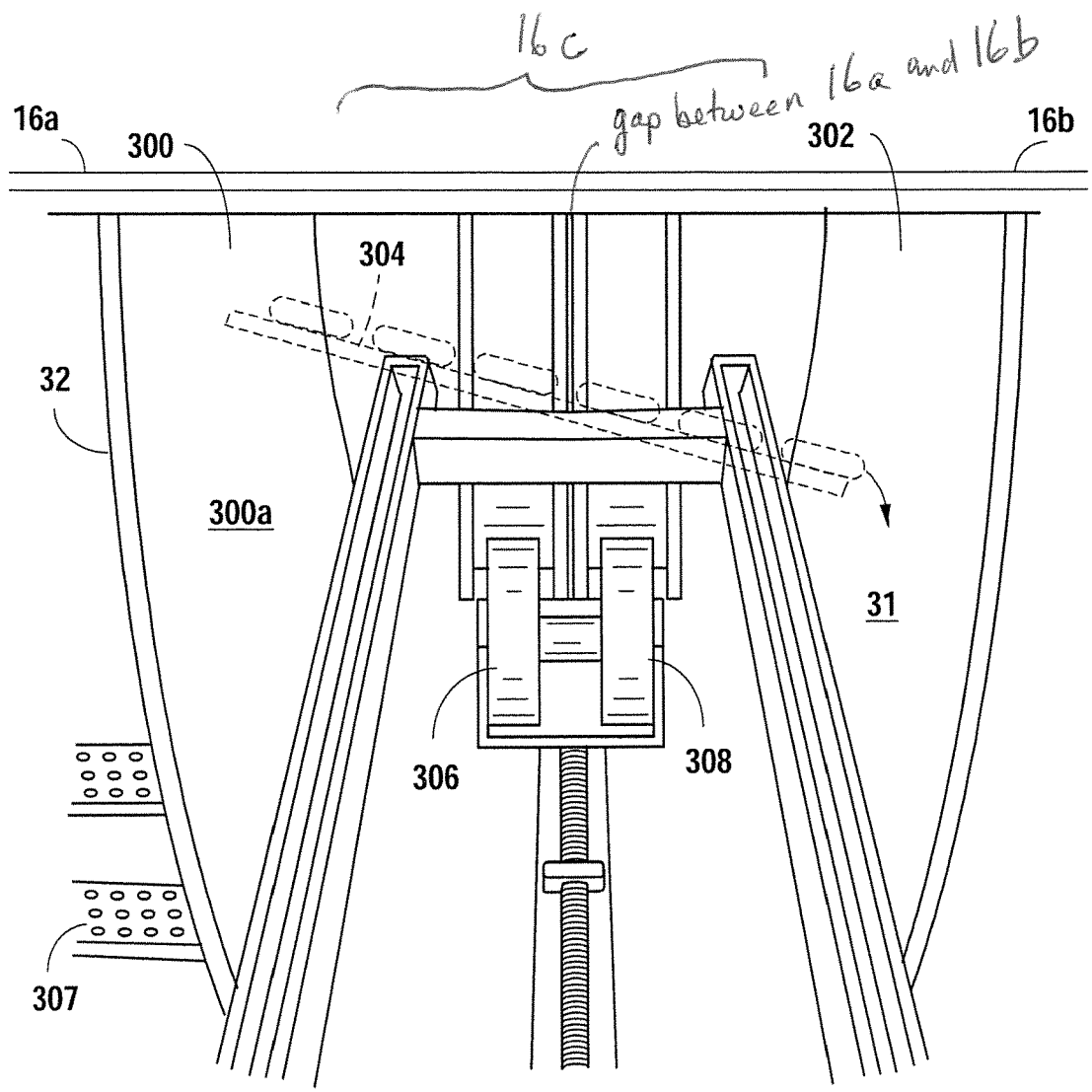
FIGS. 4B, 4C, and 4D illustrate perspective views of details of water bath assembly.

It is seen that food product is transferred between section 16*a* and 16*b* and then transferred out of section 16*b* to laning device 17. The method of transfer is accomplished without destroying the integrity of the casing or product and product ends. The method of water transport into the first end of 16*a* has been illustrated and explained previously. The method of transport from section 16*a* to section 16*b* may be accomplished as seen in FIGS. 4B and 4C, with a tilted transfer plate 304. Lifting plates 307 may be provided in a trader wheel (16*c* FIG. 4A) or section just upstream of the transfer point between section 16*a* and 16*b* as seen in FIGS. 4B and 4C. Lifting plates 307 are perpendicular to the end wall 300*a* of shell or basket 300, so that the product may be lifted above the upper upstream end plate 304 (see also FIG. 4C). FIG. 4D illustrates a manner of transferring product out of the end wall opening 38 of second section 16*b* by the use of lifting or catch plates 309 at the end of basket 302. Product is lifted as screw 31 and basket 302 rotate together in the direction indicated in FIG. 4D. Product rolls off the lifting or catch plate 309 as it is picked up from the water and rolls through chute 314 which may have an open top 314*a* and a canted bottom wall 314*b* to allow the product to roll onto the laning device 17.

Air jet assembly 34 may be provided with multiple, housing engaging airjets 36 in the lower portion 18*b*. A compressor 38 and manifold 40 may be provided to provide compressed air to the multiple airjets, the compressed air being injected into the separate aqueous solutions below water level WL to provide gentle agitation to help maintain food product integrity and for helping the chemical and physical reactions generated by the chemicals and heat of the water W. Two water solution handling systems 42*a*/42*b* may be provided, including multiple water pipes 44, engaging separate pumps 46*a*/46*b* and heaters 48*a*/48*b* to provide separate closed loop (with makeup water) circulation of heated water solutions to the lower portion 18*b* of sections 16*a*/16*b*. The first section 16*a* is typically about 8 feet long; the second section 16*b* though similarly constructed may be shorter, typically about 4 feet long. The two sections 16*a*/16*b* may be of a single assembly as seen in FIGS. 2 and 4 or two separate units. The first section will typically contain between about 600 and 900 gallons of solution, the second section between about 300 and 600.

In one embodiment, an aqueous solution in the first section 16*a* has about 12 to 22% sodium chloride or other suitable salt (measured by refractometer) with a pH adjusted to between about 0.8 to 3.2 (or, in another range, about 1.8 to about 2.0), using organic food grade acids or a blend of acids, (such as acids available from pH Fresh Technology). The water solution is heated by means of heater 48 in one range to between about 100° F. to about 160° F. (or between about 120° F. and 140° F.), depending upon product sizing and desired casing characteristics.

Figure 4A:
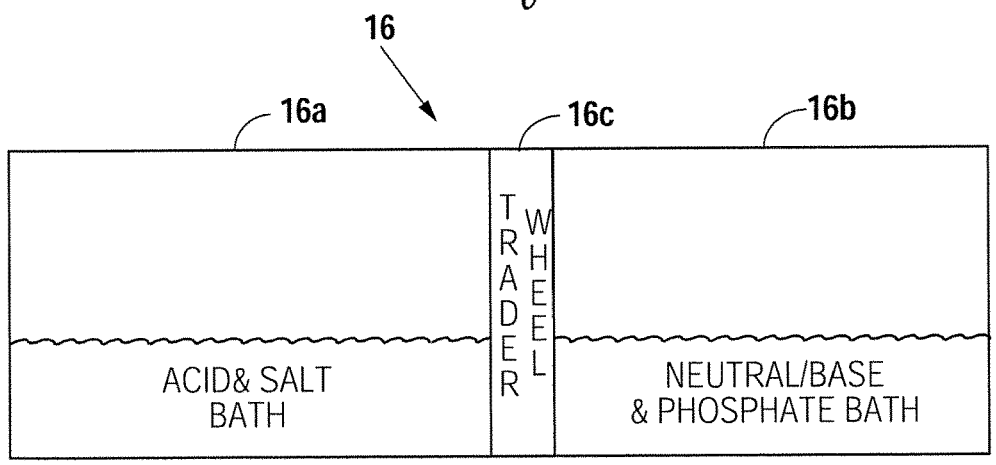
Figure 4C:
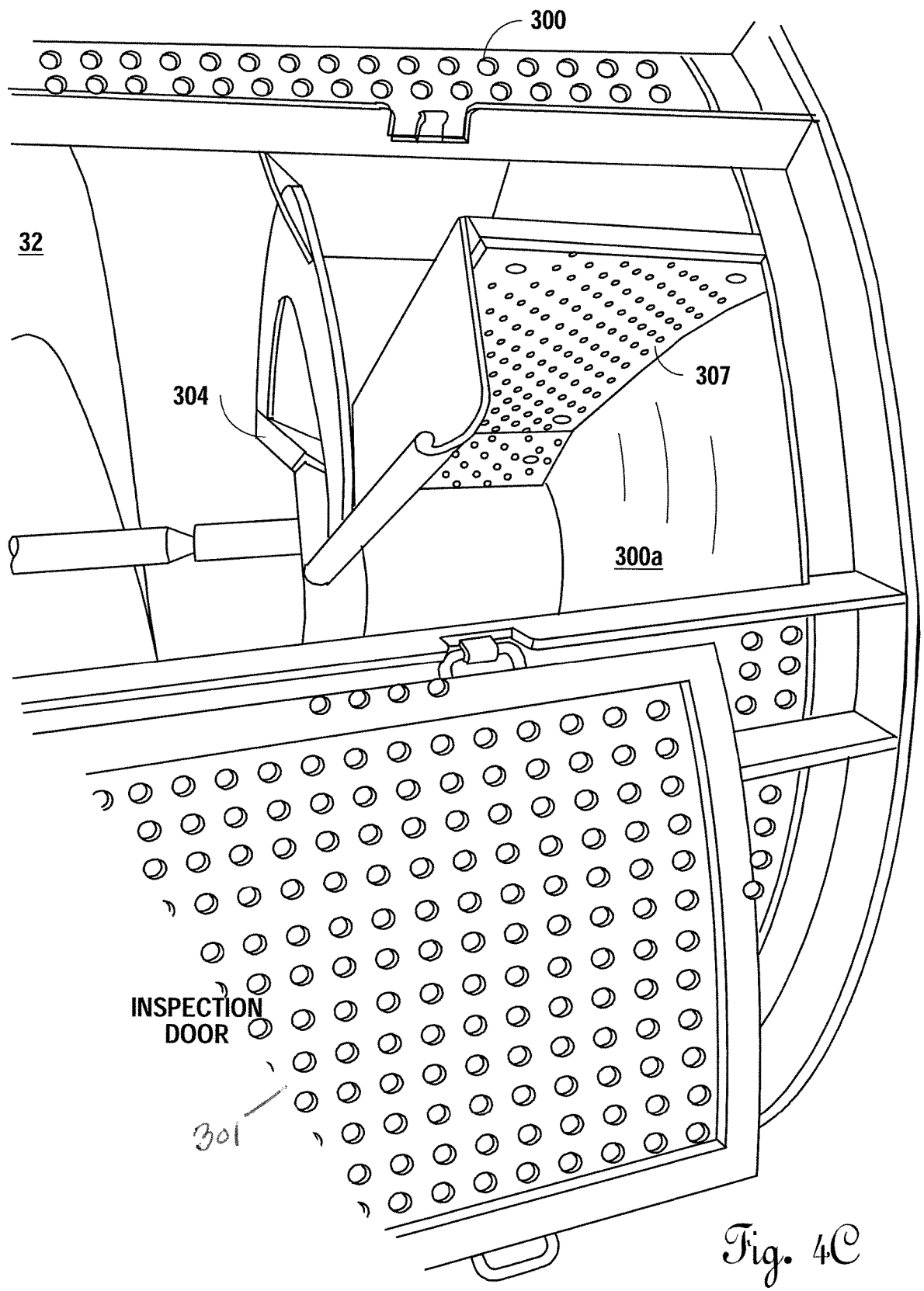
Figure 4D:
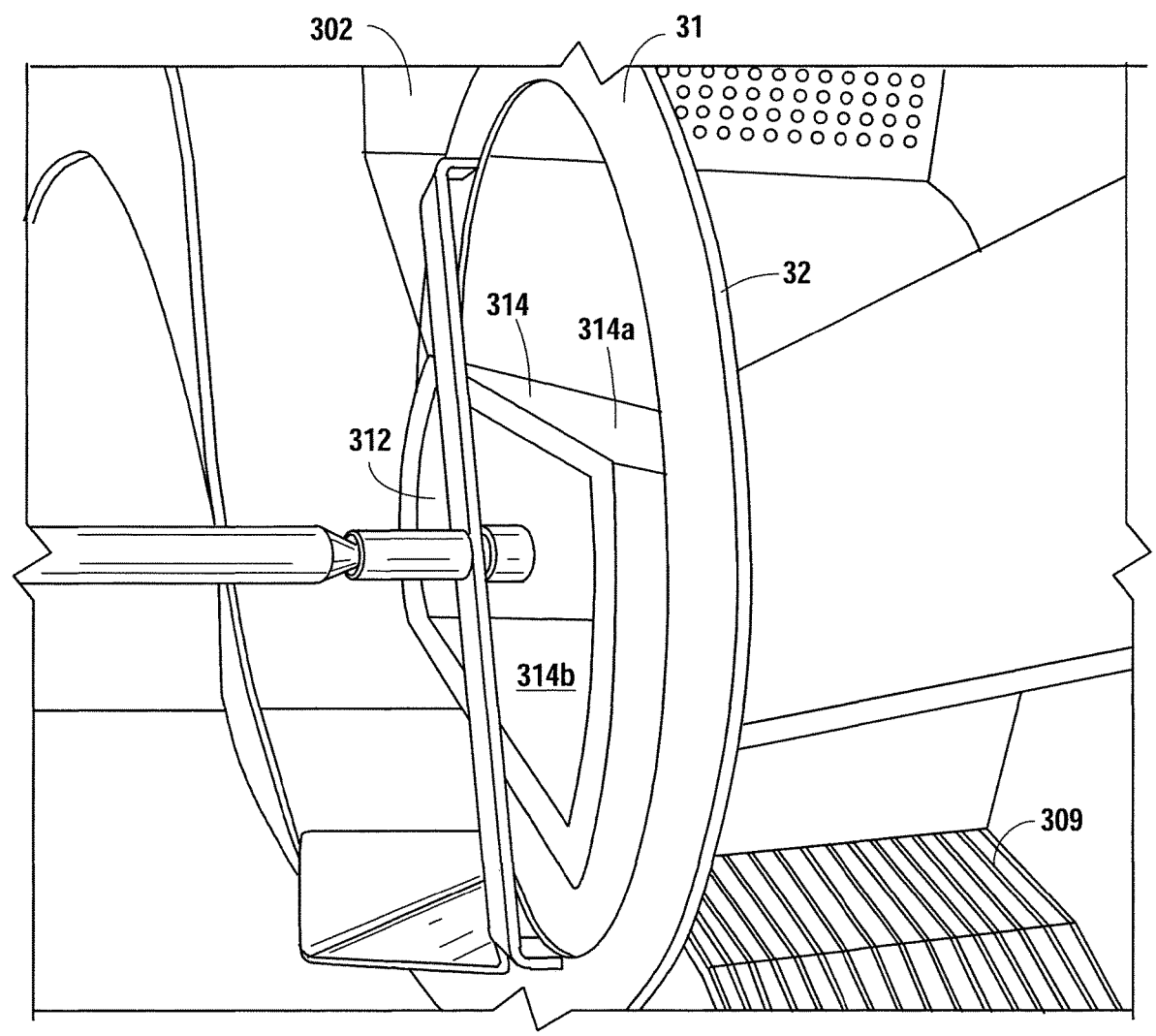

The product remains in the first aqueous salt and acidic bath and hot water bath assembly 16 from about 4 to about 12 minutes, depending upon product size and desired casing characteristics, and is then transferred through a bucket dump or trader wheel 16*c* see FIG. 4A or other suitable transfer device, such as a transfer plate 304 (see FIG. 4B), between basket 300 of section 16*a* and 302 of section 16*b*. FIG. 4B also shows the use of internal drive wheels 306/308 for engaging motors M1 and M2 for internal screw drive (see FIG. 4 for external screw drive) to a second water bath/heat step. While the first water bath heating step provides a warm acidic aqueous environment, the second water bath typically provides an aqueous solution with a pH of about 7.0 to about 9.0, and may include about 12% to about 22% solids by refractometer of food grade phosphates (sodium or di-potassium) or other suitable salt to help rinse the casing of salt from the previous step and open the collagen fibers so as to help the casing accept liquid smoke of the smoking step. The aqueous non-acidic solution is heated to about 125° F. to 150° F. in one range depending upon product size and desired casing characteristics (internal temperature of emulsion should reach about 117° F.). The links are continually lightly agitated to ensure that the product remains in its original round link shape and may remain in this second water bath/heating step for about 2 to about 10 minutes, depending upon product size and desired casing characteristics, where it is transferred to the pre-dry oven via a vibrating collated laning device 17 (see FIG. 5).

This second water bath step is conditioning of the casing for pre-drying (meaning before smoking) and smoking. The phosphates or other salt of the second bath are chosen to keep the moisture out of the collagen so it doesn't lose its integrity. Moreover, the heat, salt and pH combine to open up the fibers in the collagen to prepare it for the pre-dry, smoke, and cross-link steps set forth below. The open fibers allow the smoke and dyes or other additives to more easily be taken up into the casing. The use of the indicated pH and the phosphates (or other suitable salt) are designed to substantially remove the salt of the first water bath and to remove and neutralize the acid of the product that remains from the first step.

It is noted that the two water bath steps also use the water to move the sausage horizontally. That is to say, the machinery illustrated in FIGS. 2 and 4, showing the two water baths is designed to use the water as a transport medium to physically move the links at the same time it is being treated by the heat and chemicals of the two steps. The effectiveness of the water and the means of wet heating and transport allow for, among other things, the advantages of a physically smaller machine, especially in terms of length and height, than that required by most prior art processes, to achieve the same pre-smoke preparation, for the sausage or other meat products. A device that may be useful in practicing Applicant's water bath steps is a LYCO Rotary Drum Cooker (72"×8' or 4'), from LYCO Mfg., Columbus, Wis. modified according to the structural and functional details set forth herein.

In FIG. 4, controls 49a/49b is provided to control input into motors M1/M2 to independently adjust the speed of the two screws to control the rate of product flow in each of the two sections 16a/16b, and also to control the temperature of the water in each section. Controls may also be provided for pH meters 310/312 (pH adjustment) and refractometers 315/316. FIG. 4 discloses heaters 48a/48b to independently control heating the solution in the two sections 16a/16b. Air jets 36 in conjunction with compressors 38 and manifold 40 comprise an airjet assembly 34. The airjet assembly helps support the products (provides bouancy and some turbulence), as the air jets are located at or near the bottom of the housing, so that the products do not all settle. They also help keep the product round and keep the sticky collagen casing on the products from sticking one product to the other.

FIG. 4 also illustrates a makeup water assemblies 318/320, including makeup water (fresh 318a or salt water 318b) reservoirs with a pair of valves (318c on salt water, 318d on fresh water) for providing makeup water (fresh or salter water) to each section, as water is lost or as solids content goes out of range. Independent valves 318c/318d unnumbered on 320 may control the water levels of each section independently and/or solids content when coupled with appropriate water level sensors and solids sensor (refractometer) to maintain the level of water preselected level and the solids controls of salt content of each separate section is maintained by refractometers 315/316 in each solution controlling the valves, so as to selectively add salt water if solids get too low or fresh water if solids too high. If the solids are in the proper range, both valves will be open together at appropriate flow to add keep water near the proper level. In addition, the pH in each of the sections 16a/16b (at least first section 16a) may be automatically monitored and controlled thru pH meters and pH controls.

Pumps 46a/46b to help control the flow of water through the sections, which pumps may be controlled through controller 49a/49b. In one embodiment, the pumps 46a/46b cause the water to flow in the same direction as the screws are moving the food product FP.

The brine and the salt solutions of the previous steps will have the effect of dehydrating the collagen and partially the emulsion so as to, among other things, help maintain integrity of the casing. The smoke pre-drying step will also further dehydrate, by the application of warm air to the product, to further help set and bond the casing. Cross-linking of the collagen fibers one to the other will primarily take place during the liquid smoking step as more further set forth below. The first and second heating steps and the first and second aqueous solutions will help prepare the multiple links for smoking and cross-linking. In the first heating step, a combination of salt pH time and water temperature help the protein layers of collagen bond one to the other and the lowest layer of the collagen and the casing to bond to the emulsion. The second heating step and the second non-acidic aqueous solution will help rinse some of the salt of the previous step (for flavor purposes) and help open the fibers of the collagen casing to help the liquid smoke get taken up into the casing. In both the first and second heating steps, the physical integrity of the collagen casing, which may be delicate at this point, needs to be maintained and improved. Moreover, the open ends, where the emulsion is exposed from the casing, need to be maintained in a uniform condition.

Figure 7A:
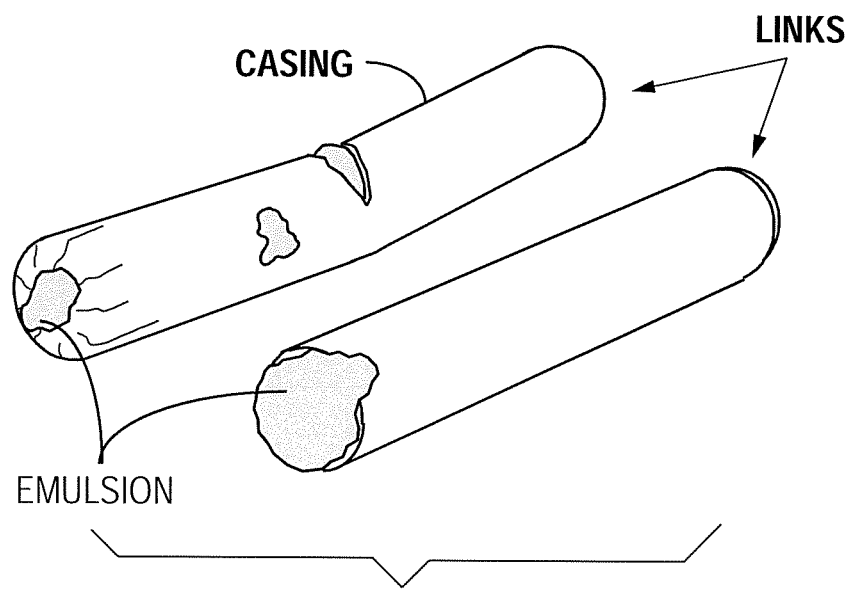
FIGS. 7A and 7B show links that are damaged (unsaleable) and links that are saleable.
Figure 7B:
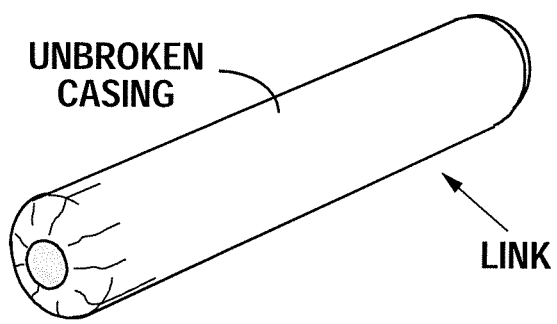

FIGS. 7A and 7B are provided to appreciate the difference between the links that are unacceptable because the casing is either broken or the ends are too open or irregular and a link that is satisfactory and saleable. The physical integrity of the casing and the links are in part a function of the mechanical energy of the water bath assembly. The mechanical energy, if it is too high as a result of too much product, too much turbulence (jets), or too much jostling (water flow and/or screw speed), can result in damaged casing. Thus, by adjusting these parameters, to slow water, to reduce the amount of product coming into the water bath assembly or to reduce turbulence, will help achieve the proper casing integrity.

It is seen that casing bonding will be assisted by dehydration, both with the use of brine and with the use of dry heat, up to the smoker and by the use of acid and heat in the first bath (followed by rinse and fiber conditioning in the second bath). The resident time of the product, the temperature, the pH, the percent of dissolved solids, and other relevant factors may be controlled to help ensure that there is a proper set or bonding of the collagen casing when it leaves the first water bath section 16a. This may be done by manually inspecting food product in sections 16a or as it comes out of the water bath assembly 16 and tugging slightly or lifting on the collagen casing to see that it has the proper elasticity and toughness and does not fall apart. Moreover, a quick visual inspection will determine whether or not there are physical tears in the collagen casing that will require adjustment of mechanical energy and/or the chemistry and physical conditions of either (or both) the first or second bath. If there is no mechanical damage to the product, but poor bonding, then adjusting the chemistry or heat may help to get proper bonding (see FIGS. 7A and 7B). The bonding of the casing to the emulsion can be checked by lifting or rolling back the casing where it meets the emulsion at the link ends. Proper boding can be both seen and felt. Solids may be increased for better bonding, less than 12% solids is typically too low regardless of pH. Solids too high is typically not a problem for bonding, but is a problem for flavor retention of the salt. pH may be lowered to help get proper bonding or the temperature may be lowered (while going to a longer resident time). Moreover, increased resident time alone in the baths may increase proper bonding.

The function of the first drying step is to maintain proper round cross section to the links as well as drying of the casing (the product is wet coming out of the water bath assembly) so that when then the liquid smoke is applied, it may be taken up into the casing. If the links are wet when they go into liquid smoke, then this impedes the proper take-up of liquid smoke. Smoking of the post-drying step is, in part, to remove the dampness created by the liquid smoking while maintaining and providing a uniform roundness to the product.

FIG. 5 illustrates the collated vibrating laning device 17 (Meyer Mfg.) out of hot water bath assembly 16 into forced hot air roller conveyor forced hot air drying assembly 50. The multiple randomly oriented individual food product items are received from the water bath device onto a flat portion of laning device 17 as seen in FIG. 5. The flat portion is tilted slightly and vibrates back and forth and, as it does, the vibrating food products are laned into multiple vibrating lanes, here, five, 17a/17b/17c/17d/17e. A staggered trailing edge 19 deposits the collated or laned food items as they align with the rollers of roller conveyor forced hot air dryer 50 as seen in FIG. 5.

Step 6 is a smoke pre-drying step and may utilize any prior art air dry oven with a temperature set to about 160° F. to about 210° F., with a low humidity (typically about 5 to 15% or less than 20%) to evenly dry the product, the pre-dry time is typically about 2 to 10 minutes, as the product coming from the second water bath (step 5) is already at about 117° F. internal temperature. In a preferred embodiment, the pre-drying and post-drying steps may be done through use of drying and product roller conveyor forced hot air dryer 50 as seen in FIGS. 3-3F, 6, and 6A. The pre-drying of the individual links, in one embodiment, helps to treat the exposed ends of the individual cut sausage by dehydration.

Following the pre-drying step, the sausage may be transferred via conventional means, such as a conveyor or via roller conveyor forced hot air dryer 50 to a liquid smoking chamber 116 (see FIGS. 6A and 6B) for step 7, the smoking step, where sausage links are exposed to a liquid smoke, dying (coloring) and a cross-linking solution, to cross-link and/or color the product in ways known in the art. For example, a smoke machine or chamber 116 that provides partial submersion and/or a spray bath from spray nozzles 116a like for about 10 to 15 seconds in a solution of liquid smoke which may be heated to about 110° F. to about 120° F. The cross-linking provides stability to the casing, including the collagen casing.

Step 8 is a post-drying step, where the sausage product continues to a post-dry oven and is dried typically on the same machinery or the roller conveyor forced hot air drying assembly 50 used in the pre-drying step (step 6) and set at a temperature to about 160° F. to about 210° F., a low humidity (typically about 2 to 10%) to help dry the product, coagulate the cross-linked collagen and/or set the color. Post-drying is typically about 3 to 10 minutes and the links typically are about 120 to 130° F. going to the vacuum packaging machine 118, Step 9, such as vacuum packaging machines known in the art.

The final process packages the product, finishes the cooking (pasteurization), and chills it in ways known in the art or by using applicant's novel machine. Applicant's packaging Step 9 is illustrated in FIG. 1 and may be achieved by using prior art packaging machinery 118, such as made by Multivac, for packaging multiple links in a single package. Applicant's cook/chill Steps 10/11 may be achieved in cook/chill machinery 120 that is similar to the modified LYCO illustrated in FIG. 4, but utilizing packaged goods moving through the water bath/screw combination and, wherein, following the cooking is a chill step with the packaged product moving through a chill section of the water bath assembly or a separate water bath with chill temperature control and heat exchanger (cooler) and separate speed control on the screws. Water alone may be used in the cook/chill sections typically at about 185° F. temperature (sufficient to pasteurize the product) in the cook section (16a) (to get internal temperature of links to at least 160° F.) and at 36° F. temperature in the chill section (16b). From the cook/chill steps 10/11, Applicant goes to box-off of the packaged products for subsequent shipping, the box-off step way achieved through machinery by methods known in the art.

One of the advantages of Applicant's system is it is low profile and does not require extensive vertical machinery (see FIG. 2). The aspect ratio, length/height for the machine of this system is typically 2 or greater or preferably 3-20, where length is from product intake to boxing, and height is from the support surface to the highest point of any machine in the line. More specifically, Applicant's system is a system in which a collagen gel coated food emulsion, such as sausage, may be prepared without the large rocking basket dryer system of the prior art, instead using Applicant's water bath to make more efficient use of space. In one embodiment, Applicant's entire system from the stuffing through boxing can be achieved in a vertical room which has a maximum of 8' to 12' ceilings and a linear footprint on a support surface, such as a floor of between about 60 and about 180 feet. It will be seen in one embodiment that the machines may align parallel to one another, for example, see FIG. 2, in which the steps after the post-dry step, including packing and a cook/chill, are linearly arranged adjacent pre-dry, smoke, and post-dry. Applicant has endeavored, in part, to reduce the physical size of the equipment necessary in the process of making the collagen coated meat product and to reduce the maintenance cost by eliminating gears and baskets.

Figure 3A:
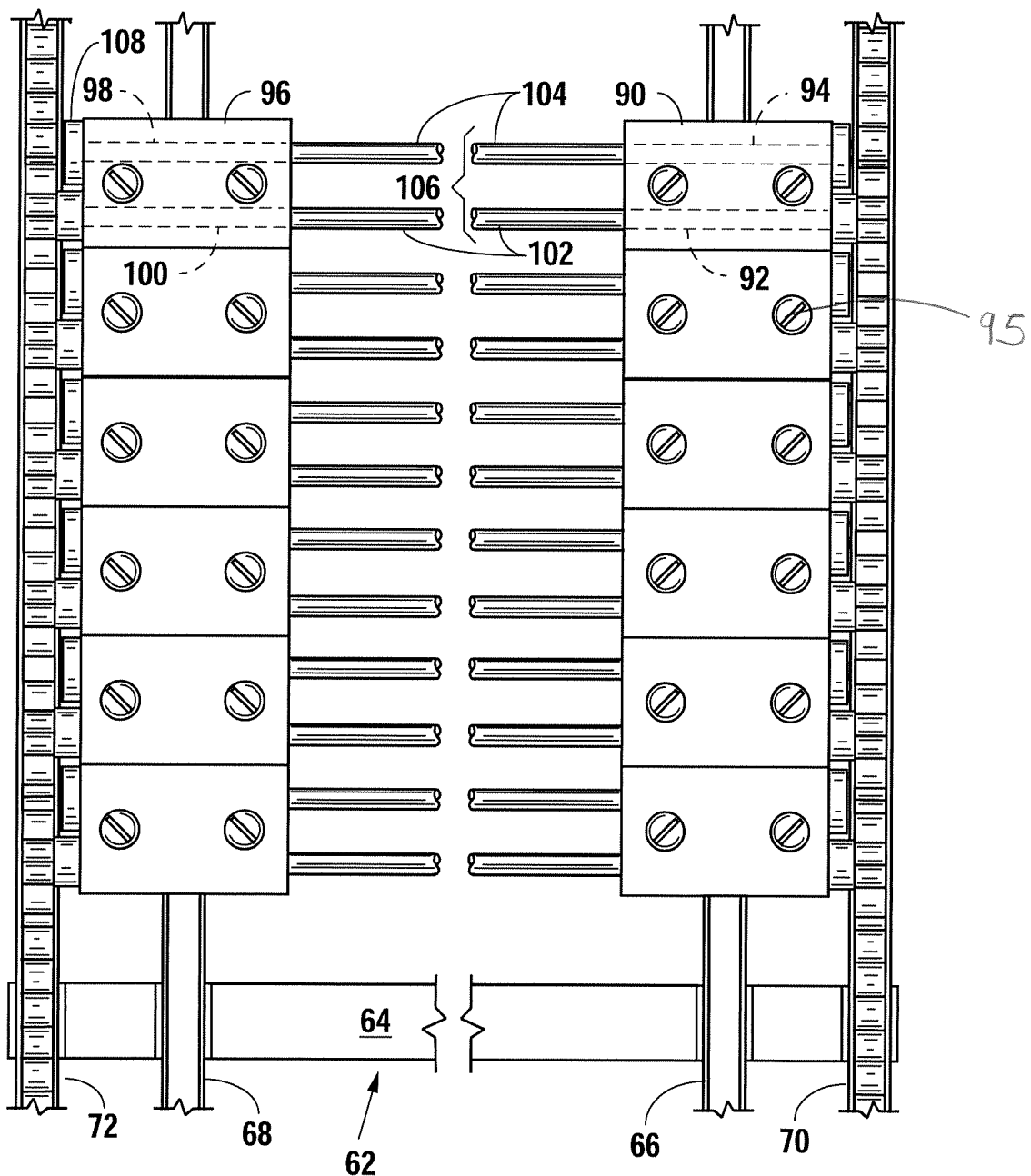
Figure 3C:
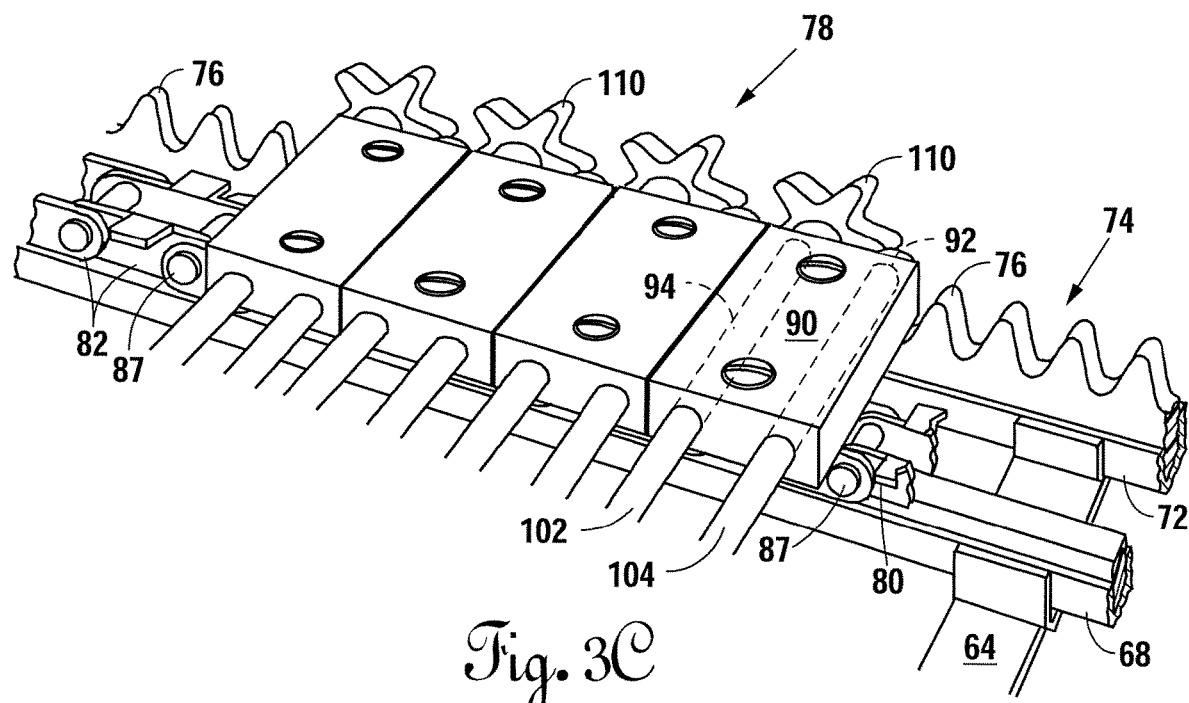
Figure 3B:
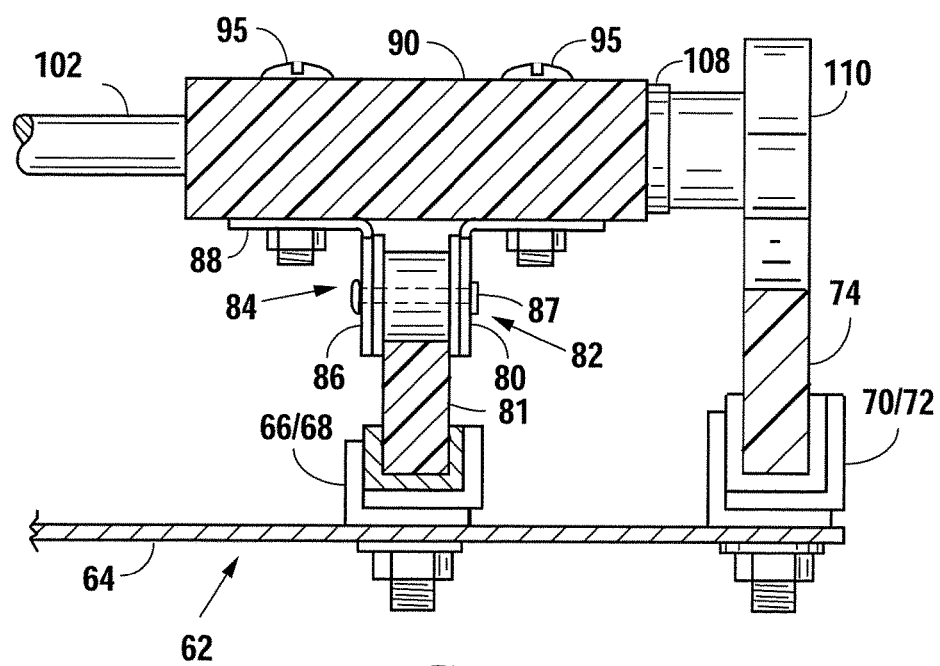
Figure 3D:
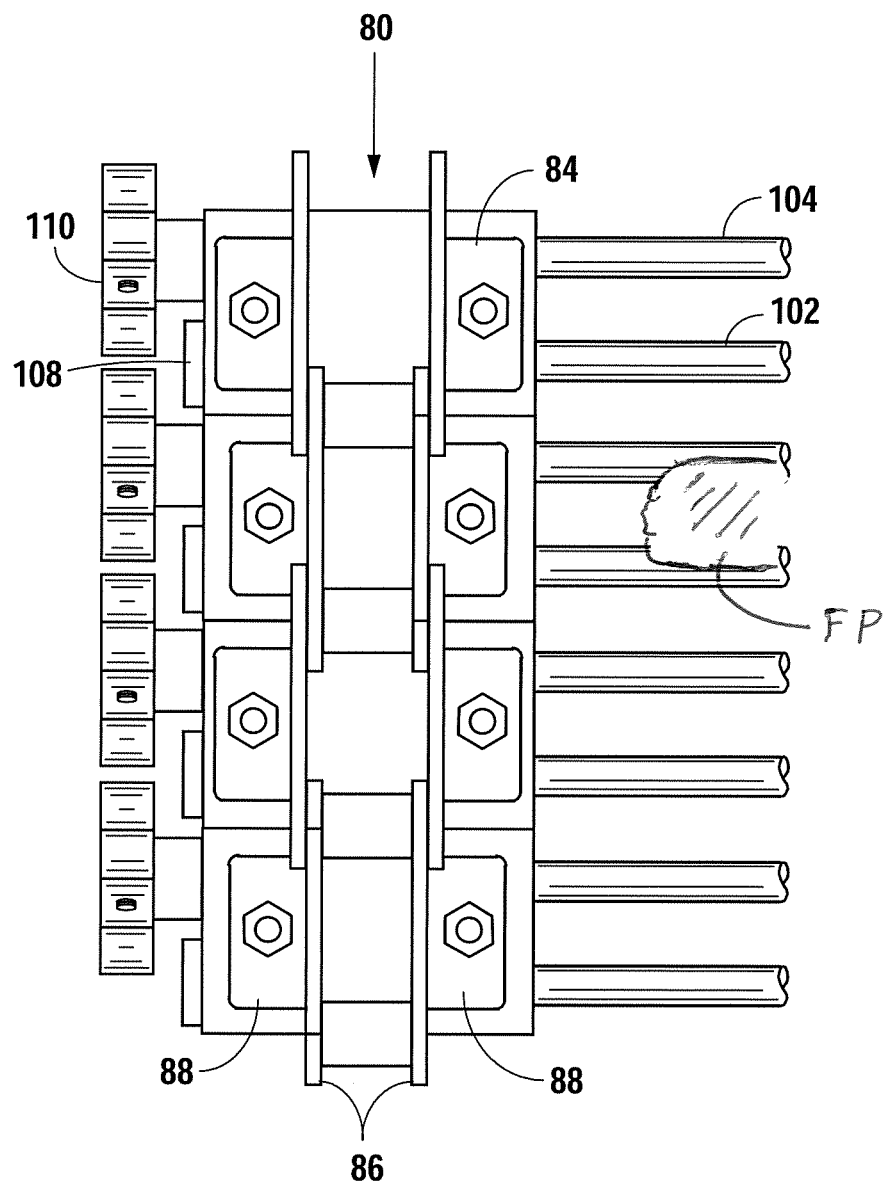
Figure 3E:
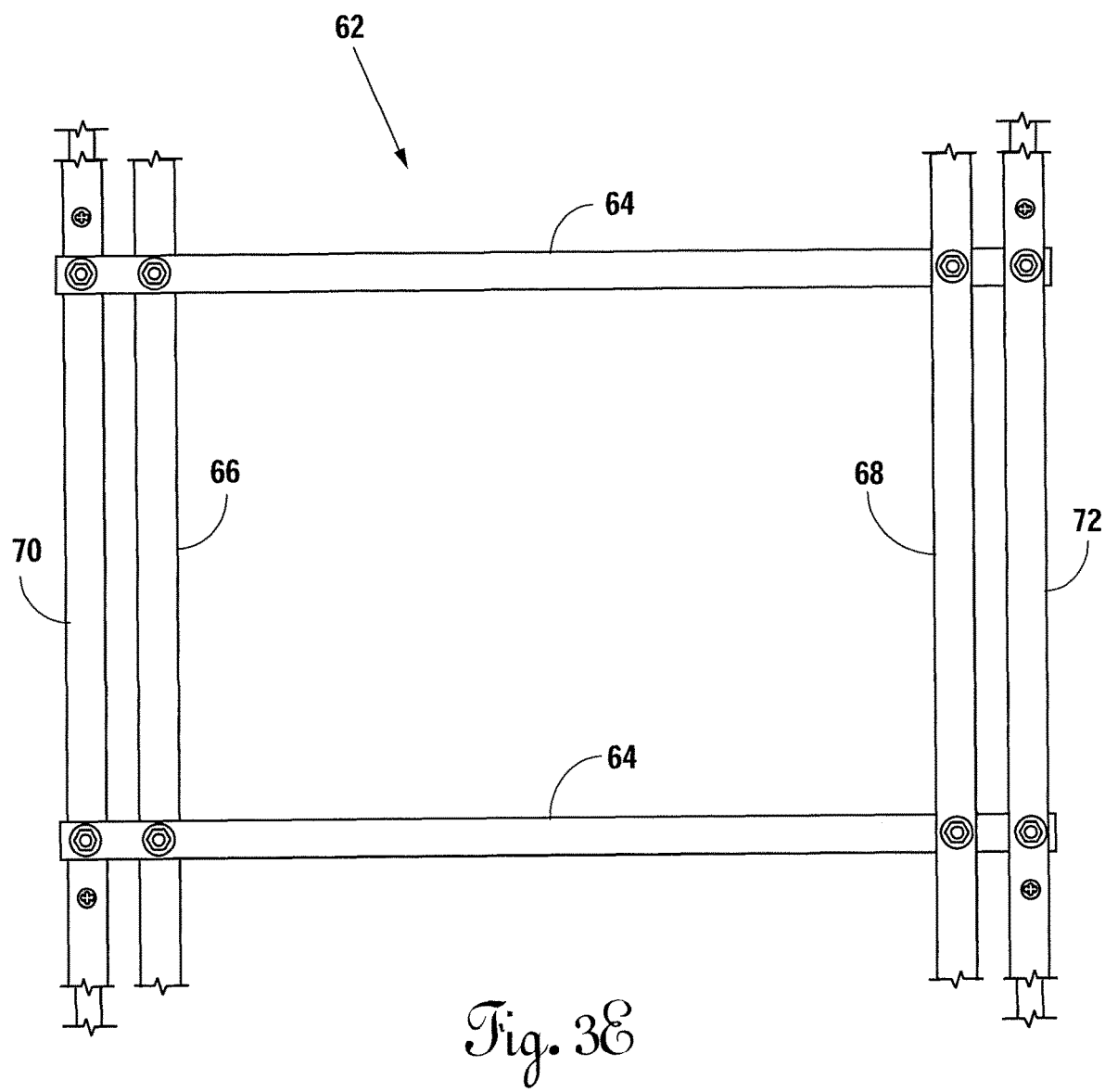
Figure 3F:
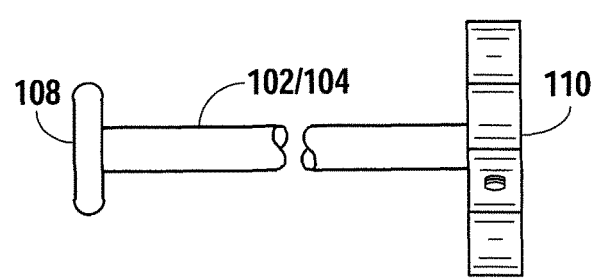

FIGS. 3-3F disclose details of a roller conveyor forced hot air dryer assembly 50 for use transporting multiple food items while heating them. Roller conveyor forced hot air dryer assembly 50 may include an external housing 63 and one or more air handling units top 52a/bottom 52b designed to move hot air about the product as the product is being transported. Air handling units 52a52b each may include a fan assembly 56, including a motor 60, a heating element 58, and a shroud 65 to direct air to the food products on a roller/conveyor assembly 54 and for engaging the fan and the heating element. Heating element 58 heats moving air, which fan assembly 56 and shroud direct to the food product. There may be an air handling unit above 52a and below 52b the rollers as seen in FIG. 3 to help ensure even heating and both fan and heat controls (not shown) may be used to control air flow and hot air temperatures.

The food product, such as sausage links or frankfurters, is carried on a food product roller/conveyor assembly 54, which may include a frame 62. Housing 63 may engage, or at least partly enclose, both the air handling units 52a/52b and at least partly enclose roller/conveyor assembly 54. Legs 73 may engage frame 62 and/or housing 63 to support roller conveyor forced hot air dryer assembly 50. Frame 62 is designed to be stationary and acts to hold other static or dynamic elements of the food product roller/conveyor assembly 54 in spaced relation. Frame 62 may include multiple transverse members 64, the multiple transverse members engaging inner longitudinal members 66/68 and outer longitudinal members 70/72 (see FIG. 3E). The inner and outer longitudinal members being paired laterally as seen in FIG. 3A. A rack 74 with upstanding teeth 76 thereon is seen to rest in longitudinal members 70/72 and is directed upward (FIG. 3B or 3C) or may be tied into and suspended above frame 62 and directed downward (see FIG. 3). Rack 74 is positioned such that teeth 76 engage drive sprockets 110 at the ends of roller members 102/104 (see FIG. 3C).

The roller/conveyor assembly 54 is provided and may include a pair of link chains 80 configured as set forth herein. Link chain 80 may be supported vertically spaced apart above the inner longitudinal members 66/68 in the manner set forth in FIG. 3B by support member 81. The links 82 of link chain 80 may include mounting brackets 84. Mounting brackets 84 may include depending members 86 and horizontal members 88, the two members of one link spaced apart on chain link axles 87 (see FIG. 3B). Horizontal members 88 are adapted to receive laterally spaced apart roller mounting blocks 90/96 through the use of fasteners 95, the paired chain and mounting block assemblies on either side of the frame are as seen in FIG. 3A (chain omitted for clarity).

In FIG. 3A, mounting block 90 is seen to have a first and second 92/94 channels and mounting block 96 is seen to have first and second channels 98/100 therein. The channels are adapted to receive the removed ends of roller members 102/104 (see FIG. 3B), these paired roller members 106 being supported in mounting blocks 90/96, so they may roll therein. As seen in FIG. 3F, at the removed ends of axle support roller members 102/104 is a land 108 (to, along with roller drive sprocket 110, prevent left or right movement of roller members) on one end to position the removed end against the outer wall of the mounting block and the roller drive sprocket 110 at the opposite end of the land. Roller member drive sprocket 110 will cause rotation of the axle support roller members as they are driven from one end of the frame to the other as seen in FIG. 3. This is due to chain 80 pulling the roller/conveyor assembly 78, which includes drive sprockets 110 across teeth of rack 74 (see FIG. 3, upper rack; FIG. 3B, lower rack). Arrow A in FIG. 3 shows the longitudinal movement of the cylindrical food product resting between the rollers and Arrow B indicates the rotational direction of the food product. The combined rotation and longitudinal movement helps ensure even drying while maintaining the round physical configuration of the food product. A pair of motor driven chain drive sprockets 114 are located on either end of a frame 62 mounted drive axle 112, which may be motor driven, as with an electric motor by a speed controller. FIG. 3 shows a setting finger 113, which may be attached to the frame and is provided so that the chain passes by, but the teeth of the roller member sprocket will strike it as the teeth pass by. For example, in FIG. 3, you will see that the chain is moving from left to right, and the roller member drive sprocket 110 moving from left to right is just about to have one of its teeth strike setting finger 113. When that happens, it will set the roller member drive sprocket in a proper position so it does not jam when it strikes the leading edge of rack 74.

Figure 6:
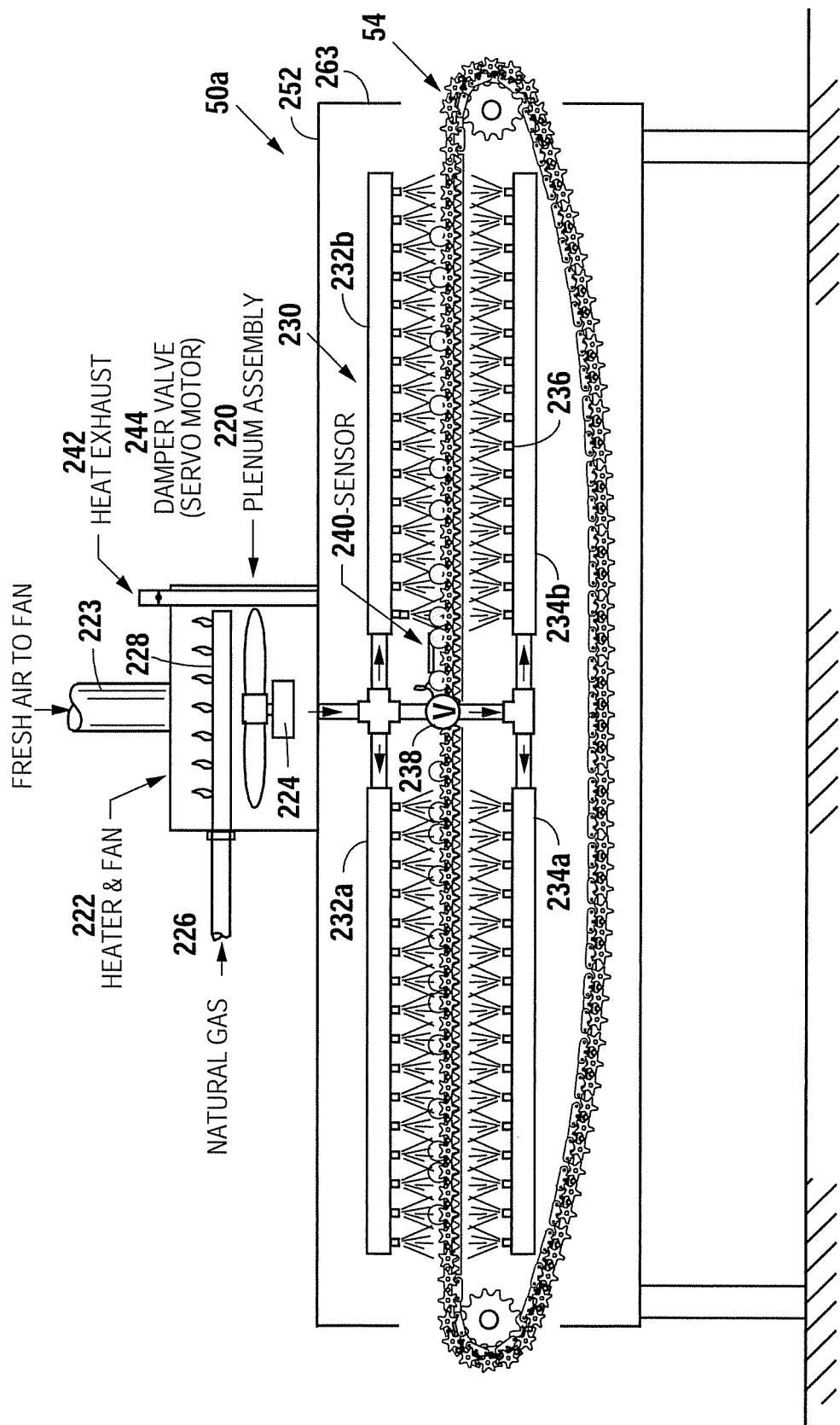
FIG. 6 is an alternate embodiment 50a of a forced hot air roller conveyor assembly in elevational view.
Figure 6A:
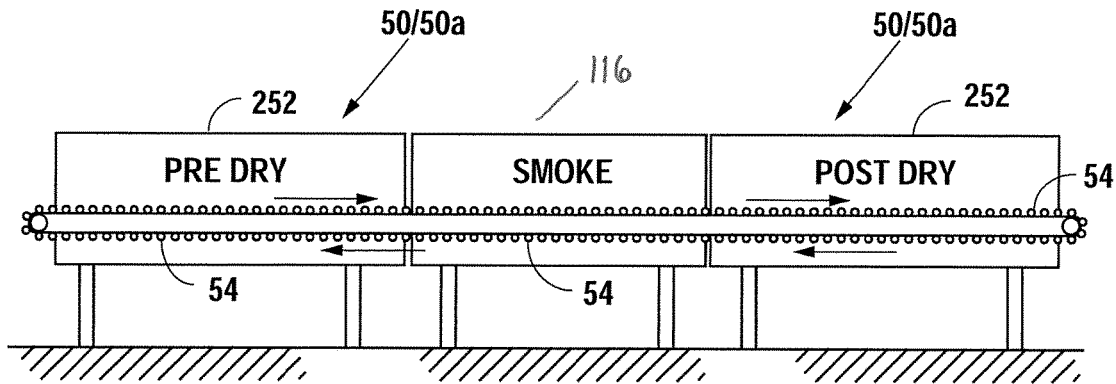
FIGS. 6A and 6B illustrate the use of the roller conveyor with the process and the smoke details.
Figure 6B:
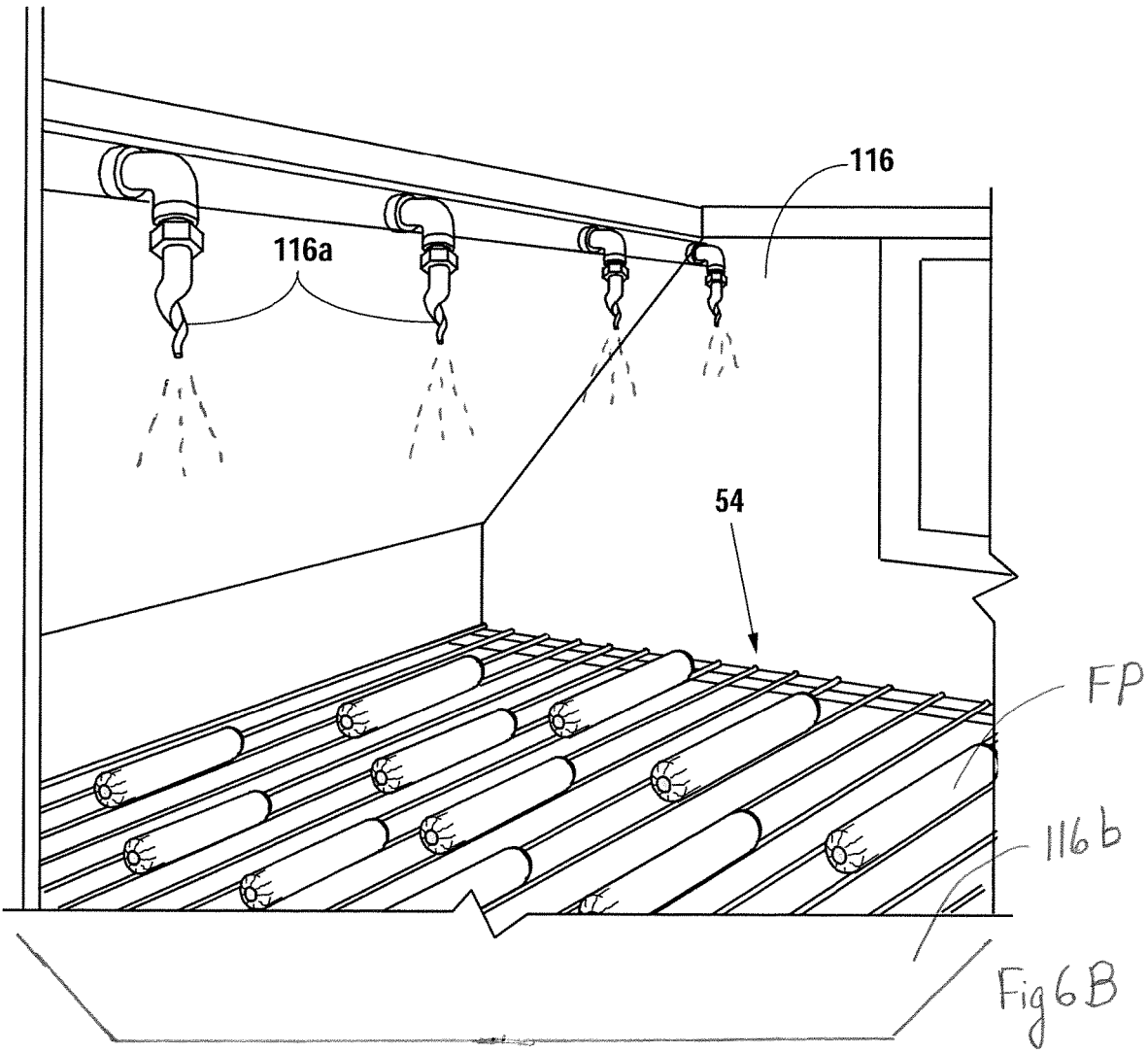

FIGS. 6A and 6B illustrate alternate preferred embodiments of a roller conveyor forced hot drying assembly 50a, which comprises a roller conveyor assembly 54 with an air handling unit 252. The function of the roller assembly is to carry individual links of food product aligned on the rollers through a forced air heater to roll the food product while heating it in a manner that provides uniform and sufficient heat as well as maintains the roundness and the form of the product and, to do so, in the machine that has a low profile. Illustrated is one such assembly 50a in which the air handling unit 252 is designed to provide substantially uniform forced hot air onto the product as it is being moved. Rectangular housing 263 may have openings on either end thereof as seen in FIG. 6. A plenum assembly 220 is provide engaged to housing 263 which plenum assembly may include a heater 222 and fan 224. The fan draws in the air through controlled openings on intake 223 and past a burner 228, which may include a natural gas conduit 226, burner 228 adjacent the fan. Engaged to the plenum assembly 220 may be a hot air distribution system 230, which is a system of pipes that will typically include multiple manifolds 232a/232b/234a/234b (some may be above product, some below) and multiple air jets 236 as laid out in FIG. 6 in one embodiment to provide forced hot air so the hot air jets to the top and bottom of the product as it rolls past the jets. Here, a pair of upper manifolds 232a/232b and lower manifolds 234a/234b are engaged to the plenum to direct the airflow to the jets. Air temperature control by a temperature sensor 240 that may be placed within the interior of housing 263, so to control the air temperature and, therefore, the food product temperature therein by turning the burner up, down or off. Typically, this temperature may be controlled between about 170 and 250° F. or about 195° F. In addition, a heat exhaust 242 engaged to the interior of housing 263 may be controlled, for example, through a servo controlled damper 244, to control the humidity within the interior of the housing.

The heat may be controlled by turning the burner on and off or up and down, and the heat is typically maintained at about 195° or between 170 and 250° F. The humidity 263 may be controlled by adjusting fresh air which typically is dryer than the air inside housing. This is done by controlling the adjustable damper valve 244, which may have a servo motor and be in one embodiment 50% open, the damper may be within heat exhaust 292. Opening the damper will typically drop humidity by allowing more air to enter through fresh inlet 223, closing the damper will increase humidity (unless it is a very wet or humid day).

FIG. 6A illustrates that a single roller conveyor assembly 54 may be used for carrying product. FIG. 6B illustrates that smoker 116 may have liquid smoke jets or sprayers 116a for spraying product or links on top of roller conveyor assembly 54 and may have a catch pan 116b below to catch liquid smoke.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

The invention claimed is:

1. A system for producing a collagen-encased food product, the system comprising:
    an extrusion head configured to co-extrude a food emulsion and a collagen to coat the food emulsion, producing a linear, collagen-coated food member;
    a brine bath configured to receive the linear food member;
    a cutting/linking device configured to link and cut the bathed linear food member into multiple collagen-coated food links;
    a first compartment configured to receive the collagen-coated food links and subject them to a first aqueous solution to at least partly coagulate the collagen, the first aqueous solution comprising salt and having a pH of less than 4.0 and a temperature between 100° F. to 160° F., the compartment configured to gently agitate the collagen-coated links and carry them from a first point, where they are received in the compartment, to a longitudinally spaced apart second point; and
    a second compartment configured to receive the at least partly coagulated collagen-coated food links and subject them to a second aqueous solution to help prepare the collagen for smoking and to remove at least some of the salt of the first aqueous solution, the second aqueous solution comprising food-grade phosphates and being non-acidic and having a temperature between 125° F. to 150° F., wherein the compartment is configured to carry the at least partly coagulated collagen-coated food links from a first point where they are received to a longitudinally spaced apart second point.

2. The system of claim 1, further comprising a first air handler configured to subject the food links from the second compartment to an air temperature between 130° F. to 220°

F., with a humidity between 5% to 15%, for between 2 to 10 minutes to partly dry the links.

3. The system of claim 2, further comprising a liquid smoker configured to subject the partly-dried food links to liquid smoke.

4. The system of claim 3, further comprising a second air handler configured to subject the smoked food links to an air temperature between 160° to 210° F., with a humidity between 5% to 15%, for between 2 to 10 minutes.

5. The system of claim 1, further comprising:
a roller conveyor configured to receive the food links from the second compartment and continually rotate them about their longitudinal axis while moving them horizontally; and
a first air handler configured to allow the roller conveyor to pass therethrough to subject the food links to an air temperature between 130° F. to 220° F., with a humidity between 5% to 15%, for between 2 to 10 minutes to evenly partly dry the food links.

6. The system of claim 5, further comprising:
a liquid smoker configured to allow the roller conveyor to pass therethrough to subject the partly-dried food links to liquid smoke; and
a second air handler configured to allow the roller conveyor to pass therethrough to subject the smoked food links to an air temperature between 160° to 210° F., with a humidity between 5% to 15%, for between 2 to 10 minutes.

7. The system of claim 1, wherein the first compartment includes a first screw drive and the second compartment includes a second screw drive.

8. The system of claim 1, wherein the first compartment is configured to keep the food links in the first aqueous solution for between 4 to 12 minutes, and the second compartment is configured to keep the food links in the second aqueous solution for between 2 to 10 minutes.

9. The system of claim 1, wherein the first aqueous solution has a salt content between 12% to 22%, and the second aqueous solution comprises between 12 to 22% food grade phosphates.

10. The system of claim 1, wherein the first aqueous solution has a pH between 1.0 to 3.2 and the second aqueous solution has a pH between 7.0 to 9.0.

11. The system of claim 1, wherein:
the first aqueous solution has a salt content between 12% to 22% and a pH between 1.0 to 3.2; and
the second aqueous solution comprises between 12 to 22% food grade phosphates and a pH between 7.0 to 9.0.

12. A system for producing a collagen-encased food product, the system comprising:
a first compartment configured to receive collagen-coated food links and subject them to a first aqueous solution to at least partly coagulate the collagen, the first aqueous solution comprising salt and having a pH of less than 4.0 and a temperature between 100° F. to 160° F., the compartment configured to gently agitate the collagen-coated links and carry them from a first point, where they are received in the compartment, to a longitudinally spaced apart second point; and
a second compartment configured to receive the at least partly coagulated collagen-coated food links and subject them to a second aqueous solution to help prepare the collagen for smoking and to remove at least some of the salt of the first aqueous solution, the second aqueous solution comprising food-grade phosphates and being non-acidic and having a temperature between 125° F. to 150° F., wherein the compartment is configured to carry the at least partly coagulated collagen-coated food links from a first point where they are received to a longitudinally spaced apart second point.

13. The system of claim 12, further comprising:
an extrusion head configured to co-extrude a food emulsion and a collagen to coat the food emulsion, producing a linear, collagen-coated food member;
a brine bath configured to receive the linear food member; and
a cutting/linking device configured to link and cut the bathed linear food member into the collagen-coated food links.

14. The system of claim 12, further comprising a first air handler configured to subject the food links from the second compartment to an air temperature between 130° F. to 220° F., with a humidity between 5% to 15%, for between 2 to 10 minutes to partly dry the links.

15. The system of claim 14, further comprising a liquid smoker configured to subject the partly-dried food links to liquid smoke.

16. The system of claim 15, further comprising a second air handler configured to subject the smoked food links to an air temperature between 160° to 210° F., with a humidity between 5% to 15%, for between 2 to 10 minutes.

17. The system of claim 12, further comprising:
a roller conveyor configured to receive the food links from the second compartment and continually rotate them about their longitudinal axis while moving them horizontally; and
a first air handler configured to allow the roller conveyor to pass therethrough to subject the food links to an air temperature between 130° F. to 220° F., with a humidity between 5% to 15%, for between 2 to 10 minutes to evenly partly dry the food links;
a liquid smoker configured to allow the roller conveyor to pass therethrough to subject the partly-dried food links to liquid smoke; and
a second air handler configured to allow the roller conveyor to pass therethrough to subject the smoked food links to an air temperature between 160° to 210° F., with a humidity between 5% to 15%, for between 2 to 10 minutes.

18. The system of claim 12, wherein the first compartment includes a first screw drive and the second compartment includes a second screw drive.

19. The system of claim 12, wherein the first compartment is configured to keep the food links in the first aqueous solution for between 4 to 12 minutes, and the second compartment is configured to keep the food links in the second aqueous solution for between 2 to 10 minutes.

20. The system of claim 12, wherein the first aqueous solution has a salt content between 22% to 26%, and the second aqueous solution comprises between 12 to 22% food grade phosphates.

21. The system of claim 12, wherein the first aqueous solution has a pH between 1.0 to 3.2 and the second aqueous solution has a pH between 7.0 to 9.0.

22. The system of claim 12, wherein:
the first aqueous solution has a salt content between 12% to 22% and a pH between 1.0 to 3.2; and
the second aqueous solution comprises between 12 to 22% food grade phosphates and a pH between 7.0 to 9.0.

* * * * *